US008837719B2

(12) United States Patent
Reffe

(10) Patent No.: US 8,837,719 B2
(45) Date of Patent: Sep. 16, 2014

(54) CRYPTOGRAPHIC METHODS AND DEVICES FOR PSEUDO-RANDOM GENERATION, ENCRYPTING DATA, AND CRYPTOGRAPHICALLY HASHING A MESSAGE

(75) Inventor: Nicolas Reffe, Montpellier (FR)
(73) Assignee: Oridao, Montpellier-Cedex 2 (FR)
(*) Notice: Subject to any disclaimer, the term of this patent is extended or adjusted under 35 U.S.C. 154(b) by 1159 days.
(21) Appl. No.: 12/602,626
(22) PCT Filed: Jun. 4, 2008
(86) PCT No.: PCT/EP2008/056889
  § 371 (c)(1),
  (2), (4) Date: Dec. 1, 2009
(87) PCT Pub. No.: WO2008/148784
  PCT Pub. Date: Dec. 11, 2008

(65) Prior Publication Data
  US 2010/0142705 A1    Jun. 10, 2010

(30) Foreign Application Priority Data
  Jun. 5, 2007 (EP) .................................... 07301086

(51) Int. Cl.
  *H04L 9/22* (2006.01)
  *H04L 9/28* (2006.01)
  *H04L 9/06* (2006.01)
(52) U.S. Cl.
  CPC ............ *H04L 9/0662* (2013.01); *H04L 9/0618* (2013.01); *H04L 9/0643* (2013.01); *H04L 2209/125* (2013.01)
  USPC .................... 380/46; 380/28; 380/37; 380/43
(58) Field of Classification Search
  CPC ... H04L 9/0662; H04L 9/0643; H04L 9/0693; H04L 9/0618
  USPC ................ 380/37, 42, 46; 708/250, 252, 254
  See application file for complete search history.

(56) References Cited

U.S. PATENT DOCUMENTS

| 5,003,596 | A | 3/1991 | Wood |
| 5,734,721 | A | 3/1998 | Clark |
| 5,796,836 | A | 8/1998 | Markham |
| 7,197,142 | B2 * | 3/2007 | Alten ............................. 380/46 |
| 7,715,563 | B2 * | 5/2010 | Lindteigen .................... 380/274 |
| 2001/0012363 | A1 * | 8/2001 | Smeets .......................... 380/46 |
| 2004/0090907 | A1 * | 5/2004 | An .............................. 370/208 |
| 2004/0228480 | A1 * | 11/2004 | Fiske ............................ 380/28 |
| 2010/0067687 | A1 * | 3/2010 | Chandramouli et al. ....... 380/37 |

FOREIGN PATENT DOCUMENTS

| JP | H05-501925 A | 4/1993 |
| JP | H10-508450 A | 8/1998 |
| JP | 3188940 B2 | 7/2001 |
| WO | WO 96/33564 | 10/1996 |
| WO | WO 98/38767 | 9/1998 |

OTHER PUBLICATIONS

International Search Report dated Jun. 16, 2009.
Japanese Office Action dated Mar. 13, 2013, issued in JP Application 2010-5107782 (English translation).

* cited by examiner

*Primary Examiner* — Linglan Edwards
(74) *Attorney, Agent, or Firm* — Fitch, Even, Tabin & Flannery LLP

(57) ABSTRACT

The invention relates to the general field of digital security and more particularly cryptography. In particular it proposes a device and a method of encrypting a sequence of data. The invention also relates to a cryptographic device (1) and a cryptographic method of generating a pseudo-random data sequence (13) and their favored use in the field of digital security, in particular for encrypting and decrypting data and for cryptographically hashing messages.

23 Claims, 19 Drawing Sheets

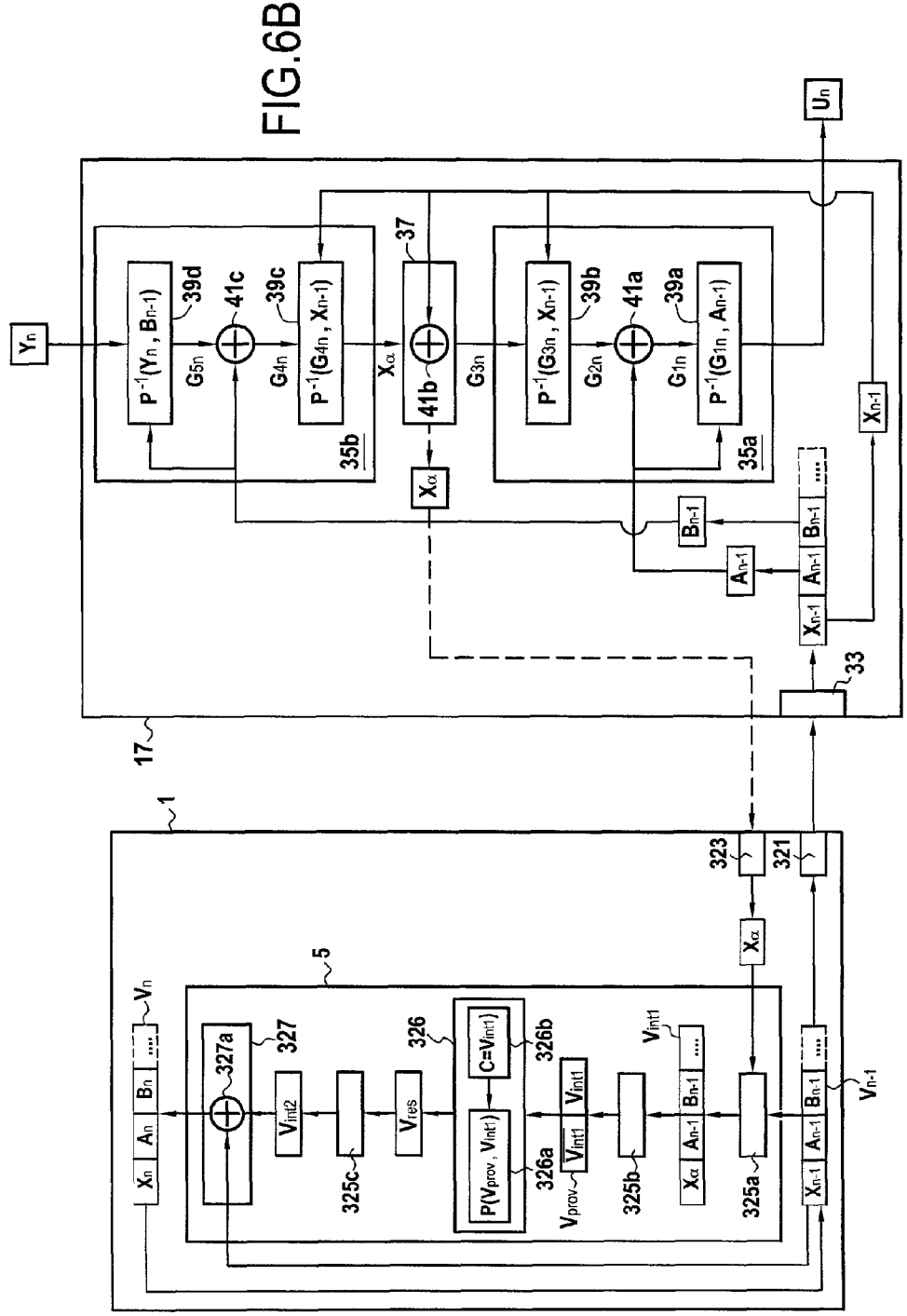

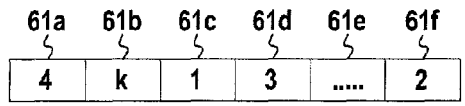

vkey (1)=0  | 2 | 3 | 6 | 4 | 7 | 5 | 1 |    vkey (1)=1  | 3 | 1 | 5 | 6 | 2 | 7 | 4 | vkey (2)=0  | 2 | 3 | 6 | 4 | 7 | 5 | 1 |    vkey (2)=1  | 3 | 1 | 5 | 6 | 2 | 7 | 4 | vkey (3)=0  | 2 | 3 | 6 | 4 | 7 | 5 | 1 |    vkey (3)=1  | 3 | 1 | 5 | 6 | 2 | 7 | 4 | vkey (4)=0  | 2 | 3 | 6 | 4 | 7 | 5 | 1 |    vkey (4)=1  | 3 | 1 | 5 | 6 | 2 | 7 | 4 | vkey (5)=0  | 2 | 3 | 6 | 4 | 7 | 5 | 1 |    vkey (5)=1  | 3 | 1 | 5 | 6 | 2 | 7 | 4 |

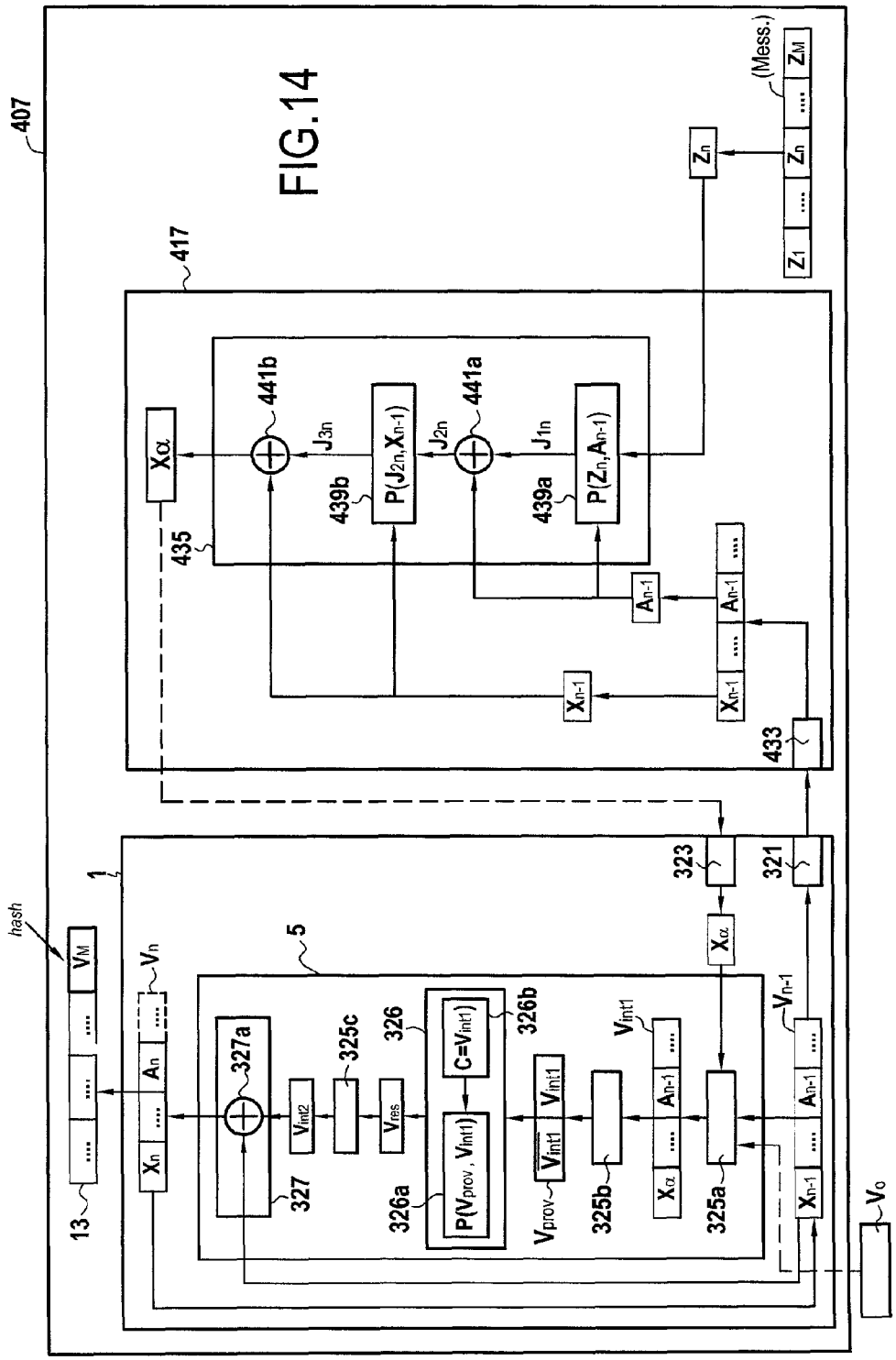

CRYPTOGRAPHIC METHODS AND DEVICES FOR PSEUDO-RANDOM GENERATION, ENCRYPTING DATA, AND CRYPTOGRAPHICALLY HASHING A MESSAGE

This Application is a U.S. National Stage Application under 35 U.S.C. §371 of International Application PCT/EP2008/056889 filed Jun. 4, 2008, which designated the U.S. and was not published in English, and claims the foreign filing date benefits and priority from European Application 07301086.0, filed Jun. 5, 2007, and the complete disclosure of each said application is incorporated herein by reference.

TECHNICAL FIELD OF THE INVENTION

The invention relates to the general field of digital security and more particularly to cryptography.

It proposes inter alia a device and a method for symmetrically encrypting a data sequence. The invention also relates to a cryptographic device and a cryptographic method for generating a pseudo-random data sequence and to their favored use in the field of digital security, in particular for encrypting and decrypting data and for cryptographically hashing messages.

BACKGROUND OF THE INVENTION

Encrypted data is systematically exchanged at a high bit rate using symmetrical encryption algorithms.

The efficacy of a symmetrical encryption algorithm is evaluated on the basis of its resistance to cryptanalysis, which depends on the complexity of the processing applied to the information to be encrypted, the absence of weaknesses, and its resistance to a brute force attack, which depends on the size of the encryption key.

Moreover, the efficacy of symmetrical encryption also depends on its speed of execution. The bit rate at which the encryption algorithm operates must be higher than the maximum bit rate of the application concerned for information that is to be encrypted/decrypted.

Accordingly, for a high bit rate application, secure solution integrators are faced with a dilemma when choosing an encryption algorithm because, with increase in the bit rates of information to be processed and for constant calculation power, the time available for processing information decreases, leading to compromises in terms of cryptanalysis resistance.

Prior art stream encryption mechanisms that perform symmetrical encryption encrypt data continuously, in the course of successive iterations, and can be used advantageously when the data bit rates are high and/or when it is essential to encrypt/decrypt information in real time.

Referring to FIG. 15A, stream encryption mechanisms generally take the form of a pseudo-random bit generator G (based on shift registers, for example), with parameters set by a key K and an initialization vector, with which an exclusive-OR operation (written $\oplus$ and corresponding to binary addition modulo 2) is applied to an output bit $k_i$ of the generator and to a bit $p_i$ from the data to be encrypted, thus generally leading to the calculation of a single output bit $c_i$ on each iteration $\underline{i}$.

These stream encryption methods, although extremely fast in a hardware implementation because of their simplicity and the small number of instruction sets used, have several severe limitations that are generally accepted because they are a direct corollary of the high bit rates specified.

Firstly, the pseudo-random generators used by these stream encryption methods are generally based on the use of linear or non-linear shift registers. Used as such, these shift registers have serious cryptographic shortcomings. To render the pseudo-random behavior of the generator cryptographically acceptable, it is known to combine the shift registers with one another using combination functions. The increase in the number of registers necessary to feed these combination functions and the complexity of the combination functions themselves significantly impact on the number of components required in a hardware implementation and limit the speeds of execution of the pseudo-random generation algorithm and the encryption method.

Moreover, these pseudo-random generators generate only a very limited number of output bits at a time (typically one bit, possibly 8 or 16 bits). Consequently, the number of bits encrypted on each iteration of the stream encryption method is also very limited and does not necessarily meet the real requirements of the applications having data protected by the method.

To alleviate these drawbacks, stream encryption mechanisms that use block encryption algorithms for the pseudo-random generation can be used. An example of a stream encryption mechanism using a block encryption algorithm in cipher feedback (CFB) mode is represented in FIG. 15B and described in the document by B. Scheier entitled "Applied Cryptography protocols, algorithms and source code in C", Second edition, 1996. Using block encryption algorithms for pseudo-random generation in stream encryption methods has at least two major drawbacks, however: firstly, their high overall size in a hardware implementation; and secondly, their slow execution speed.

Furthermore, the design of the stream encryption mechanisms described above, based on applying an exclusive-OR operation to an output bit of the pseudo-random generator and to a bit of the message to be encrypted, renders the pseudo-random generator directly observable in the context of standard cryptanalysis and commandable in CFB mode as shown in FIG. 15B. In other words, the state of the outputs of the pseudo-random generator is directly accessible by combining the text in clear and the encrypted text using an exclusive-OR operation and provides continuously information that is directly usable for cryptanalysis of the algorithm. Accordingly, in the example of a stream encryption method represented in FIG. 15B, it is possible by observing the outputs and commanding the inputs of the encryption method to bring the shift register of the pseudo-random generator to a predefined state, which constitutes a major cryptographic weakness.

Consequently there exists a need for a solution for fast generation of cryptographically secure pseudo-random sequences of vectors of any predefined size, an encryption/decryption solution that is free of such drawbacks of observability and commandability of the pseudo-random generator, and a guaranteed high level of digital security, whilst ensuring simple and efficient implementation (notably in terms of execution speed) both in hardware and in software.

OBJECT AND SUMMARY OF THE INVENTION

A first aspect of the invention addresses this need by proposing a cryptographic method of generating a pseudo-random data sequence formed by a succession of values of a state vector of size $\underline{k}$ generated iteratively from an initial value of the state vector. According to the invention, during each iteration of the cryptographic method, in order to generate a current value of the state vector for that iteration, a predetermined number $\underline{d}$ of permutations of size k1 greater than or equal to k are applied successively to a provisional vector of size k1 including at least one first intermediate vector of size k formed from at least one section of a preceding value of the state vector generated in a preceding iteration. Each permutation is associated respectively with a distinct bit of a permutation key of size d and chosen as a function at least of the value of that bit, said permutation key being the result of selecting d distinct bits from the k bits of the first intermediate vector. The current value of the state vector is then obtained from at least one section of the result vector of this application step.

The description below relates to binary data and binary vectors, i.e. data and vectors whose components are bits. Thus a vector of size t is a vector consisting of t bits.

In the sense of the invention, the expression "vector $V_a$ comprising a vector $V_b$" means a vector $V_a$ that includes among its components all of the components of the vector $V_b$ (consecutively or not, in the same order or in any order). For example, if a vector $V_b=(1,0,0,1)$ and a vector $V_a=(0,1,V_b)$ are considered, the vector $V_a$ is a vector including the vector $V_b$ and equal to $V_a=(0,1,1,0,0,1)$.

Moreover, in the sense of the invention, the expression "section of a vector of size t" means a set of j bits of that vector occupying particular positions in that vector, j lying in the range 1 to t ($1 \leq j \leq t$). Thus a section of size t of a vector of size t refers to the vector itself.

The particular positions occupied by the j bits of the section are preferably predetermined and fixed (for example a section consisting of the first j bits of a vector or a section consisting of the last j bits of a vector). However, they could equally be determined, for example, as a function of the value of a section of the vector whose bits occupy predetermined and fixed positions, and because of this not necessarily fixed in time.

Thus on each iteration the invention produces from the current value of the generated state vector any number of pseudo-random bits less than or equal to the size k of the state vector, k being a parameter taking any value (there is no theoretical limitation on the values of k that can be considered). The invention can therefore be easily used in diverse applications requiring pseudo-random vectors of varying size (not necessarily limited to only one bit), adapting to the requirements of the target application.

Moreover, the invention proposes to generate a pseudo-random data sequence iteratively using a permutation function made up of d permutations and with parameters set (or parameterized) by a permutation key that is itself pseudo-random because it is extracted from a pseudo-random vector. Each of the d permutations is chosen from a predefined pair of permutations (which pair can vary from one permutation stage to another or remain the same for all stages), as a function at least of the value of the bit of the associated permutation key with. The size d of the permutation key (d≤k) is a parameter and can in particular be made relatively large so as to ensure better mixing of the permutated data.

The permutation function used in the invention is advantageously a one-way function. As known in itself, a one-way function can easily be calculated in one direction, but is difficult or even impossible to invert in a reasonable time (i.e. with reasonable complexity).

The permutation function used in the invention is such that calculating an output data vector as a function of an input data vector requires the evaluation of k1 equalities each with one explicit term. In contrast, on attempting to calculate an input data vector as a function of an output data vector, it is necessary to solve a multi-variate system (i.e. one for which each term is a combination of a plurality of unknowns) consisting of k1 equations each comprising $2^d$ terms in d unknowns.

Thus it is clear that such a system of equations cannot be solved simply because the number of terms in each equation is very much greater than the number of equations, and in particular is extremely large for high values of d.

Moreover, this number increases as the iterations proceed, i.e. the system is "self-complicating". In hardware terms, the consequence of this is that the set of equations to be solved cannot be written down and stored physically, in particular for large key sizes. For example, for a permutation key of size d=k=256, a multi-variable system of 256 unknowns comprising 256 equations each with $2^{256}$ terms must be solved on the first iteration.

The one-way function implemented in the invention is therefore particularly difficult to invert and robust to brute force attacks and to cryptanalysis (its mathematical complexity is very high), while offering relatively uncomplicated implementation, notably in terms of wiring, through the use of permutations. It can therefore be implemented using a low-level architecture, is compact because it requires few components, and therefore offers fast execution in a hardware or software implementation.

To enhance the quality of the generated pseudo-random sequence and to obtain a high quality of mixing, the d permutations of size k1 considered could advantageously be chosen from predefined permutation pairs P0, P1 (P0 designating a permutation associated with a bit when that bit is equal to 0 and P1 designating a permutation associated with a bit when that bit is equal to 1) satisfying at least one of the following conditions:

for each bit of the key, the permutation obtained by respective composition of P0 and P1 and the permutation obtained by respective composition of P1 and P0 are different at all points;

an identical pair of permutations P0 and P1 at all points different is used for each of the d stages of the one-way function (a stage corresponding to the application of a permutation);

a pair of permutations P0 and P1 individually different at all points from the identity permutation is used for each of the d stages of the one-way function; in this way, each bit of the permutation key affects all the bits of the input data to be permutated.

Using identical permutation pairs in each stage has the advantage of reducing the hardware complexity of the pseudo-random generation method of the invention. Only two modules, respectively corresponding to the two permutations P0 and P1, need to be implemented in hardware. To implement the invention these modules can then be used several times in succession or d identical modules could be used for each permutation (i.e. 2d modules in all).

However, these assumptions are in no way limiting on the invention, as other permutations can be considered. In particular, it is possible to consider distinct permutation pairs (P0, P1) at the different permutation stages (i.e. for the distinct bits of the key).

In a different implementation, the provisional vector further includes the vector obtained by complementing each bit at 1 of the first intermediate vector. Thus, for example, if $V_{prov}$ designates the provisional vector and $V_{int1}$ designates the first intermediate vector, then it can be taken that:

$$V_{prov}=(\overline{V_{int1}}, V_{int1})$$

in which $\overline{V_{int1}}$ designates the vector obtained by complementing each bit at 1 of the first intermediate vector $V_{int1}$.

This produces a strict avalanche effect, regardless of the value of d; i.e. modifying a single bit of the first intermediate vector $V_{int1}$ statistically affects the value of half the bits of the vector resulting from application of the one-way function and used in the construction of the current value of the state vector. The consequence of this is to limit the negative impact linked to the use of a first intermediate vector that is sparse (i.e. of low Hamming weight) and to improve the resistance of the cryptographic pseudo-random generation method of the invention to hardware attacks. The spread achieved within the process is thus excellent, which constitutes a noteworthy cryptographic quality.

Moreover, the provisional vector obtained in this way has a constant Hamming weight equal to k, whatever the value of the first intermediate vector. Also, in a hardware implementation, executing the one-way function, regardless of the values of d and $V_{int1}$, has absolutely constant electrical power consumption. In each stage of permutation of the one-way function there is a constant number of bits at 1 and the activation of each stage of the one-way function activates an identical number of logic gates whether the bit of the key concerned is at 0 or at 1. The one-way function of the invention is therefore also insensitive to hardware attacks based on power consumption analysis.

In another variant implementation of the invention, the provisional vector can be taken as equal to the first intermediate vector (k1=k).

In one particular implementation of the invention, the current value of the state vector is the result of applying an exclusive-OR operation to said section of the vector resulting from the application step and the preceding value of the state vector.

This implementation increases the mathematical complexity of the process of generating successive pseudo-random values of the state vector. The exclusive-OR operation loses all information concerning the weight of the initial value of the state vector, the Hamming weight of the state vector thus being modified as the iterations proceed.

In one particular implementation of the invention, the provisional vector and the permutation key are the same size, which is equal to the size of the first intermediate vector.

In this embodiment the description refers to a square one-way function, as opposed to a rectangular one-way function, in which the permutation key is of size d (d≤k) different from the size k1 (k1≥k) of the provisional vector to which the one-way function is applied.

In another implementation of the invention, the above cryptographic method of generating a sequence of pseudo-random data is such that each iteration further includes, before the application step, a step of obtaining a current intermediate value calculated from the preceding value of the state vector and an input data block, the first intermediate vector being formed by the preceding value of the state vector in which a section has been replaced by the current intermediate value.

Thus the pseudo-random data sequence generated by means of the invention has no particular period and follows no pre-established cycle as a function only of the initial value of the state vector. The current value of the state vector depends on the initial value of the state vector and of the whole of the input data sequence applied. This ensures dynamic evolution of the pseudo-random data sequence.

The method conforming to this way of generating a pseudo-random data sequence has highly-advantageous properties making it a potential candidate for numerous cryptographic security applications.

In particular, the invention is also directed to using such a cryptographic method of generating a pseudo-random data sequence in a method of cryptographically hashing a message to generate a digest of the message, the latter including a predetermined number M of data blocks used in turn as input data blocks for calculating the current intermediate value during successive iterations of the cryptographic method of generating a sequence of pseudo-random data in order to generate M values of the state vector. The digest of the message is then obtained from the latest value of the state vector generated in this way.

The hashing method used in this way has all the advantages of the pseudo-random generation method of the invention, in particular in terms of robustness and simplicity of implementation.

Moreover, the invention is also directed to the use of such a cryptographic method of generating a pseudo-random data sequence in a method of encrypting an input data sequence, as described in more detail below.

A second aspect of the invention relates to a method of symmetrically encrypting an input data sequence, in which, on the basis of an initial value of a state vector and a succession of input words forming said input sequence, a succession of values of said state vector and a succession of output words are generated iteratively, each iteration including the following steps:
 an encryption step in which a current output word for the iteration is calculated by a reversible application depending on a current input word and said preceding value of the state vector generated in the preceding iteration; and
 a pseudo-random generation step in which a current value of the state vector for said iteration is calculated by a non-invertible application depending at least on said preceding value of the state vector;
 said method being characterized in that:
 said reversible application includes at least first and second secret key functions, said secret keys being generated from at least one section of the preceding value of the state vector; and
 said non-invertible application further depends on a current intermediate value depending on the preceding value of the state vector and the current input word and being isolated from the input words, respectively from the output words, by means of said first secret key function, respectively said second secret key function.

In the sense of the invention, the expression "vector isolated from the input and output words" refers to a vector that is not accessible using the input and output words, i.e. not commandable and not observable by means of those words. By definition:
 a system characterized by an input, a state vector and an output is non-commandable if the state vector cannot be brought to a predetermined value by applying a finite input sequence;
 a system characterized by an input, a state vector and an output is non-observable if the value of the state vector at a given time cannot be deduced from a finite number of observations of the output sequence.

As the person skilled in the art knows, the initial value of the state vector in a symmetrical encryption process is secret. By recurrence, if the preceding value of the state vector is both non-commandable and non-observable, then the current intermediate value used to calculate the current value of the state vector in the encryption method of the invention is itself non-commandable and non-observable. Consequently, the current state vector obtained is also non-commandable and non-observable, i.e. isolated from the input and output words. This prevents direct observation of the value of the state vector or reconstruction or piloting of the succession of values of the state vector. Moreover, it is not necessary to modify the initial value of the state vector to avoid information leaking (for example a first encrypted message ⊕ a second encrypted message=a first message in clear ⊕ a second message in clear).

It is particularly advantageous that the encryption methods of the invention can be used interchangeably to encrypt a message in clear or to decrypt an encrypted message, the input data sequence being taken sometimes as equal to the message in clear and sometimes as equal to the encrypted message. Decryption is performed by the operations that are the reverse of those of encryption, which is of great benefit from the hardware implementation point of view. Also, in the remainder of the description, the expression "encryption method of the invention" refers to a method of encrypting and/or decrypting an input data sequence.

Thus it is possible to encrypt/decrypt an input data sequence formed by a succession of input words of any size with an optimum execution speed at the same time as ensuring simple and efficient implementation in hardware and in software.

The successive values of the state vector depend on the initial value of the state vector and the whole of the input data sequence. As a result, the state vector has a dynamic evolution that is non-commandable and non-observable. This ensures highly secure encryption/decryption.

In one particular implementation, the first secret key function and/or the second secret key function includes at least one exclusive-OR operation with parameters set by at least one section of the secret key of that function, i.e. by at least one section of the preceding value of the state vector.

In one particular implementation of the invention, each state vector is of size $\underline{k}$ and, during the pseudo-random generation step, to calculate the current value of the state vector, there are applied successively to a provisional vector of size k1 greater than or equal to $\underline{k}$ comprising at least one first intermediate vector of size $\underline{k}$ formed from a section of the preceding value of the state vector and from the current intermediate value a predetermined number $\underline{d}$ of permutations of size k1 each associated with a respective distinct bit of a permutation key of size $\underline{d}$ chosen as a function at least of the value of this bit, said permutation key being the result of selecting $\underline{d}$ distinct bits from the $\underline{k}$ bits of the first intermediate value and the current value of the state vector being obtained from at least one section of the vector resulting from this application step.

Thus the encryption method of the invention has the same advantages as the pseudo-random generation method of the invention described above. It can moreover include in different embodiments the different variants proposed above for the pseudo-random generation method of the invention.

Using such a pseudo-random generation method in a stream encryption algorithm has the advantage of guaranteeing a high degree of digital security at the same time as ensuring simple and efficient implementation (in particular in terms of execution speed) in hardware and software.

In a particularly advantageous variant of the invention, the input and/or output words comprise a plurality of bits variable as a function of the iteration. The state vector can then include a section indicating this number of bits variable on each iteration.

The state vector being a pseudo-random variable, the encryption method processes input words to be encrypted of variable size on each iteration, this size also varying in a pseudo-random manner as a function of the input data sequence and the initial value of the state vector. The state vector being isolated from the input and output words of the encryption method, it is impossible to determine which subdivision (in terms of size) has been effected at the level of the input words during the encryption method. This provides even better protection against cryptanalysis.

In this particular implementation of the invention, the pseudo-random generation step of each iteration can further include, when it is determined that said variable number of bits is zero from the current value of the state vector, the calculation by a non-invertible application dependent on the current value of the state vector of a new current value of the state vector replacing that current value of the state vector.

Thus the succession of values of the state vector is generated "empty" for as long as the size of the input or output words remains equal to 0 without interaction with the encryption step. In other words, the operations effected during the pseudo-random generation step are desynchronized from those effected during the encryption step, providing even more protection.

In one particular implementation of the invention:
the pseudo-random generation step is a first pseudo-random generation step forming a current value of a first state vector;
said first pseudo-random generation step is combined in parallel with at least one second pseudo-random generation step forming a current value of a second state vector; and
the current value of the state vector is the result of applying an exclusive-OR operation to the current value of the first state vector and at least the current value of the second state vector.

Thus different pseudo-random state vectors are combined, which increases the mathematical complexity of successive pseudo-random generated data by producing increasingly large cycles.

In another implementation of the invention, the encryption step is a first encryption step in which there are calculated:
a first current output word by a first reversible application depending on a first current input word and at least one first section of the preceding value of the state vector; and
a first current intermediate value.

Moreover, the method further includes at least one second encryption step in which there are calculated:
a second current output word by a second reversible application depending on a second current input word and at least one second section of the preceding value of the state vector; and
a second current intermediate value;
the current intermediate value used during the pseudo-random generation step including the first current intermediate value and at least the second current intermediate value.

Thus a plurality of signals can be multiplexed with the same state vector, which simplifies hardware or software implementation.

In another implementation of the invention, the encryption method further includes a step of cryptographically multiplexing at least two message blocks in clear to form at least two encrypted message blocks, each message block in clear corresponding to a succession of input words, and said at least two encrypted message blocks are ordered in each iteration as a function of a section of the preceding value of the state vector.

Thus the ordering or mixing on each iteration of the M encrypted blocks, combined or not, in transmission channels is pseudo-random and depends on the initial value of the state vector and the whole of the input sequences. Consequently, any modification in the input sequences modifies the mixing, thus providing optimum protection.

As described above, the invention proposes a pseudo-random generation method based on a one-way function that is robust to cryptanalysis and to brute force attacks, fast and of relatively uncomplicated hardware implementation.

Also, the invention further provides a cryptographic module adapted to generate a vector of output bits from a vector of input bits of size k1, including:
- means for forming a permutation key of predetermined size $\underline{d}$ by selecting $\underline{d}$ distinct bits from the bits of the input vector;
- means for associating with each bit of the permutation key a permutation of size k1 chosen as a function at least of the value of that bit; and
- means for applying successively to the input vector the $\underline{d}$ permutations of size k1 associated with the $\underline{d}$ bits of the permutation key to obtain said vector of output bits.

The cryptographic module of the invention advantageously uses the above-mentioned one-way function.

Moreover, the invention also provides a cryptographic generator of a pseudo-random data sequence formed of a succession of values of a state vector of size $\underline{k}$ generated iteratively from an initial value of the state vector, said generator including means for using in each iteration to generate a current value of the state vector for said iteration:
- a cryptographic module as described above adapted to generate a result vector from a provisional vector of size k1 greater than or equal to $\underline{k}$ including at least one first intermediate vector of size $\underline{k}$ formed from at least one section of a preceding value of the state vector generated in a preceding iteration, said permutation key being of size $\underline{d}$ less than or equal to $\underline{k}$; and
- means for obtaining the current value of the state vector from at least one section of the result vector.

In one embodiment, this generator further uses in each iteration:
- means for obtaining a current intermediate value calculated from the preceding value of the state vector and an input data block; and
- means for forming said first intermediate vector from the preceding value of the state vector in which a section has been replaced by the current intermediate value.

The invention further provides a device for encrypting an input data sequence adapted to generate iteratively from an initial value of a state vector and a succession of input words forming said input sequence, a succession of values of the state vector, and a succession of output words, said encryption device using in each iteration:
- encryption means adapted to calculate a current output word for said iteration by a reversible application depending on a current input word and a preceding value of the state vector generated in a preceding iteration; and
- a pseudo-random generator adapted to calculate a current value of the state vector for said iteration by a non-invertible application depending at least on the preceding value of the state vector.

According to the invention said encryption device is such that:
- the reversible application includes at least first and second secret key functions, the secret keys being generated from at least one section of the preceding value of the state vector; and
- the non-invertible application further depends on a current intermediate value depending on the preceding value of the state vector and the current input word and being isolated from the input words, respectively the output words, by means of said first secret key function, respectively said second secret key function.

In one embodiment, the pseudo-random generator of the encryption device of the invention is a cryptographic generator of a pseudo-random data sequence of the invention as described above.

In one particular embodiment of the invention, the encryption device is adapted to process input words and/or output words comprising a number of bits variable as a function of the iteration and further includes means for determining the variable number of bits in each iteration from a section of the state vector. In this embodiment the pseudo-random generator of the encryption device can further include means for calculating a new current value of the state vector replacing the current value of the state vector by a non-invertible application depending on the current value of the state vector when it is determined from the current value of the state vector that said variable number of bits is zero.

In another embodiment, the encryption device further includes a device for cryptographically multiplexing at least two message blocks in clear to form at least two encrypted message blocks, each message block in clear corresponding to a succession of input words, and said at least two encrypted message blocks are ordered in each iteration as a function of a section of the preceding value of the state vector.

The invention further provides a cryptographic hashing device adapted to generate a digest from a message including a predetermined number M of data blocks, said hashing device including:
- a cryptographic generator according to the invention as described above, generating a succession of M values of a state vector in M successive iterations;
- means for, in each of the M iterations:
  - calculating the current intermediate value for that iteration from a current data block of the message and the preceding value of the state vector generated by the cryptographic generator; and
  - supplying the current intermediate value to the cryptographic generator; and
- means for obtaining the digest of the message from the latest value of the state vector generated by said generator.

Moreover, it should be noted that, in one particular embodiment of the invention, the cryptographic generator and/or the encryption device and/or the cryptographic hashing device of the invention can be implemented by one or more data-processing systems conventionally including a central processor unit controlling by signals a memory, an input unit and an output unit interconnected by data buses.

Thus the invention also provides a computer program including program code instructions for executing a cryptographic method of generating a pseudo-random data sequence having any of the above features, a computer program including program code instructions for executing an encryption method having any of the above features, and a computer program including program code instructions for executing a cryptographic hashing method having any of the above features when those programs are loaded into and executed in a computer or data-processing system.

These computer programs can be stored on computer-readable media and can be executable by a microprocessor.

They can use any programming language and take the form of source code, object code or a code intermediate between source code and object code, such as a partially-compiled form, or any other desirable form.

The invention also provides a computer-readable information medium containing instructions of a computer program as described above.

BRIEF DESCRIPTION OF THE DRAWINGS

Other features and advantages of the invention emerge on reading the description given below by way of non-limiting illustration and with reference to the appended drawings, in which:

FIGS. 9A to 9E show examples of permutations used in the pseudo-random generator or the encryption device from the previous figures or in the cryptographic hashing device from FIG. 14;

FIGS. 10A and 10B show examples of hardware implementation of the FIG. 9C permutations;

FIG. 14 shows diagrammatically one example of a cryptographic hashing device of one particular embodiment of the invention.

DETAILED DESCRIPTION OF EMBODIMENTS

Preliminary Note and Notation

Figure 1A:
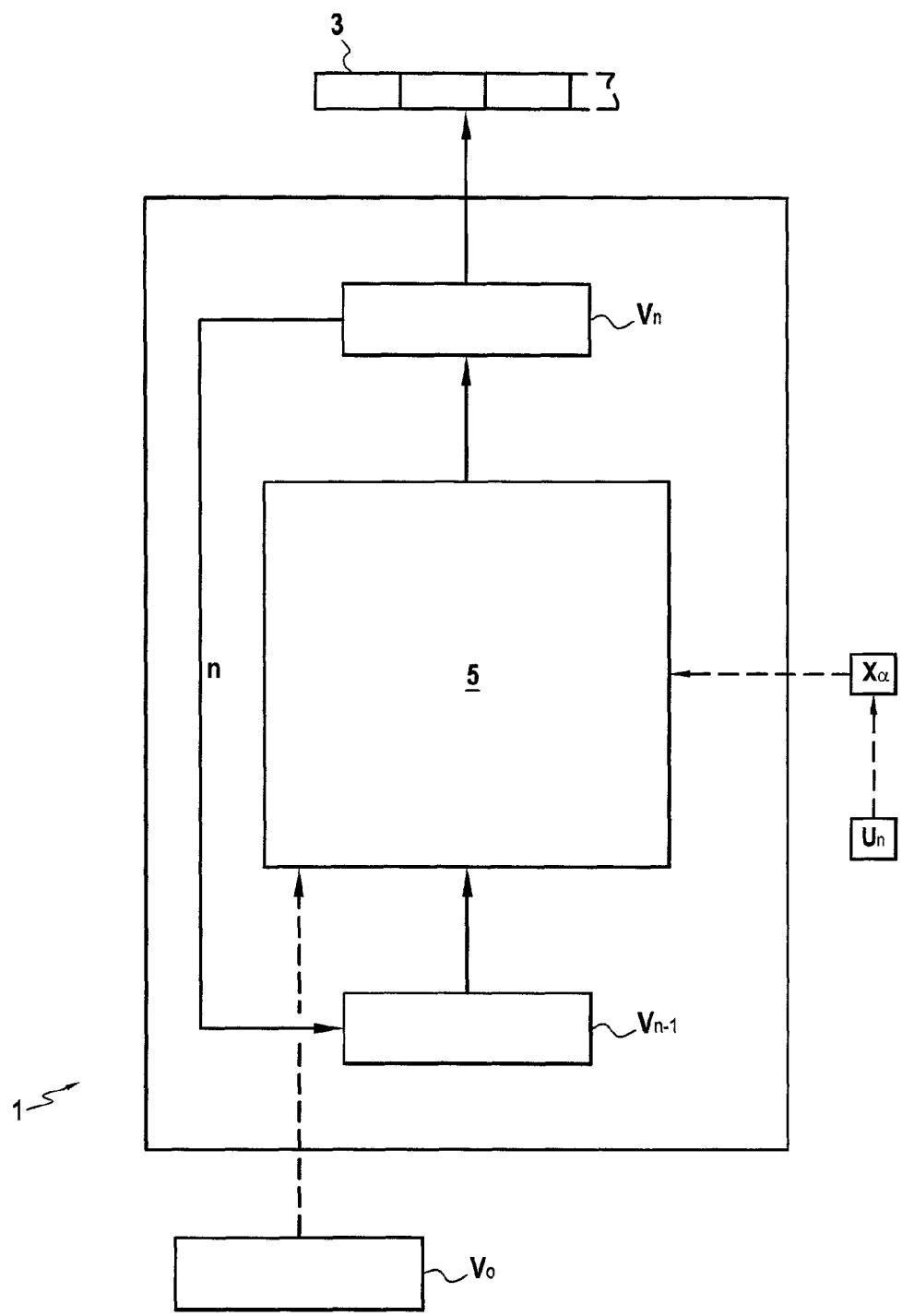
FIGS. 1A and 1B show diagrammatically a pseudo-random generator in one particular embodiment of the invention for generating a pseudo-random data sequence.

In a manner that is particularly advantageous, the invention proposes a permutation function P that is configurable (or parameterizable), i.e. a function having parameters that can be set, which function can be used in diverse cryptographic applications, as described below, in particular for pseudo-random generation, for encrypting/decrypting data, and for cryptographically hashing a message.

This permutation function P can have its parameters set as a function of the size of the data to which it is applied and has its parameters set by a so-called permutation key. Thus the following notation convention is used:

$$S=P(E,C)$$

to designate that the permutation function P as with parameters set by the permutation key C is applied to input data E to obtain output data S.

Generally speaking, for input data E of size $e$ and a permutation key C of size $p$ less than or equal to $e$, the permutation function P is the result of applying $p$ successive permutations of size $e$ to the input data E, each permutation being associated with one bit of the permutation key C and chosen as a function at least of the value of that bit.

For example, there is associated with each bit of the permutation key, i.e. with each permutation stage of the permutation function, a permutation P0 if that bit is at 0 and a permutation P1 if that bit is at 1.

The same pair of permutations (P0, P1) can be considered at the various stages of the permutation function P. These permutations P0 and P1 are then preferably defined as different from each other at all points and each individually different at all points from the identity permutation. However, these assumptions are not under any circumstances limiting on the invention, and different pairs of permutations can be considered at each stage of the permutation function, or other conditions applied to the permutations P0 and P1, for example that the permutation obtained by composing the permutations P0 and P1 must be different at all points from the permutation obtained by composing the permutations P1 and P0.

The permutation function P has different properties according to the permutation key considered.

Thus if the permutation key C is formed from data independent of the input data to which the permutation function P is applied, a bijective (or key permutation) function is obtained, i.e. the function P is invertible provided that the value of the permutation key is known, i.e. that to a value of the input data of the function P with parameters set by this key there corresponds only one value of the output data.

This property of the permutation function P is considered in particular in certain embodiments relating to an encryption/decryption device and a cryptographic hashing device of the invention.

If the permutation key C is formed from input data E to which the permutation function P is applied (in other words, if the permutation key depends on the whole or part of the input data E), a one-way function is obtained, i.e. the function P is non-invertible, in other words is easy to calculate in one direction but difficult or even impossible to invert in a reasonable time (i.e. with a reasonable complexity).

Such a permutation function with parameters set in this way (i.e. with a permutation key depending on the input data to which the permutation function is applied), and a fortiori a one-way function based on such a permutation function, has never been proposed or used in the prior art.

This property of the permutation function P is notably considered for a cryptographic module and a cryptographic generator of a pseudo-random data sequence (pseudo-random generator) in different embodiments of the invention.

In the remainder of the description, to distinguish between applications of the permutation function P as a function of its properties, the expression "surjective permutation means" refers to the means implementing the permutation function P when it is a one-way function (also referred to below for simplification as "surjective permutation"). Consequently, surjective permutation must be understood as non-invertible (i.e. non-bijective), because it is used in the context of a one-way, i.e. non-invertible, function and in the context of that one-way function, different input data E1, E2, . . . can have the same output S (for example, S=P(E1, E1)=P(E2, E2)= . . . , with E1≠E2≠, . . . ).

Similarly, the expression "bijective permutation means" refers to the means implementing the permutation function P when it is a bijective function, in other words a bijective key permutation (also referred to below for simplicity as "bijective permutation").

The features of and means for implementing the permutation function P are explained in more detail below, in particular with reference to FIGS. 9A-9E, 10A and 10B. These features and implementation means apply to the various devices and means described below using the permutation function P (whether it is a one-way function or a bijective function).

Pseudo-Random Generation Method and Generator

Figure 1B:
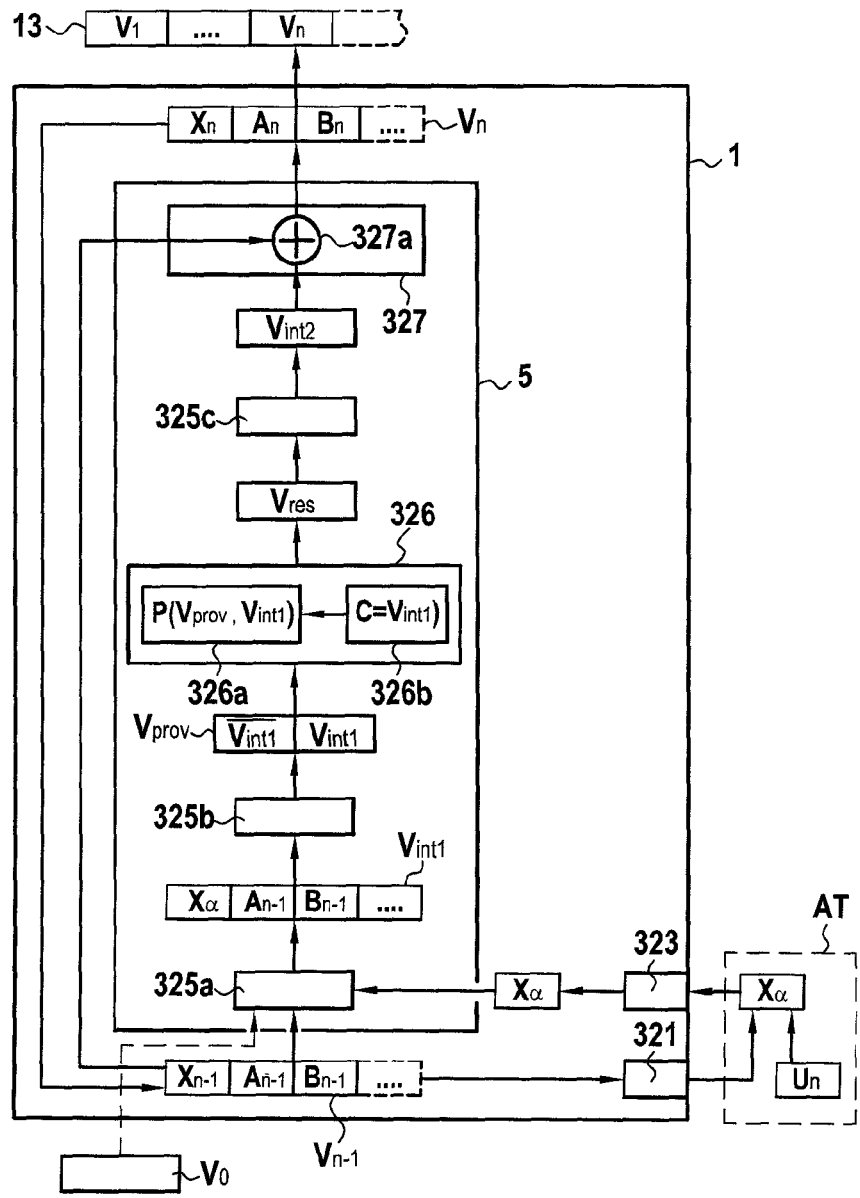

FIG. 1 represents diagrammatically an example of a pseudo-random generator 1 of the invention for generating a pseudo-random data sequence 3. FIG. 1B shows one particular embodiment of this pseudo-random generator. Note that FIGS. 1A and 1B also illustrate the principal steps of the method of the invention of generating a pseudo-random data sequence.

The pseudo-random generator 1 includes calculation means 5 which, starting from an initial value $V_0$ of a state vector V, form the pseudo-random data sequence 3 by iterative generation of a succession of values $V_0, \ldots, V_{n-1}, V_n, \ldots$ of the state vector. Note that $V_n$ corresponds to the value taken by the state vector $V_n$ on the $n^{th}$ iteration. The same convention is used in a similar way for the other variables.

The state vector V comprises a particular number $\underline{k}$ of bits (i.e. it is a vector of size $\underline{k}$, where $\underline{k}$ is an integer greater than or equal to 1).

On each iteration $\underline{n}$ of the pseudo-random generation process, the calculation means 5 calculate a current value Vn of the state vector V using a non-invertible application depending on a preceding value $V_{n-1}$ of the state vector. This non-invertible application is based on a one-way function with parameters set by a permutation key of size $\underline{d} \leq \underline{k}$.

In the example envisaged here, the state vector is advantageously fed on each iteration $\underline{n}$ with a current intermediate value $X_\alpha$ calculated by another application, for example the application AT, which can depend on the previous value $V_{n-1}$ of the state vector and a current input word $U_n$ belonging to an input data sequence (an input data block in the sense of the invention). In the example described here, the input words $U_n$ comprise a particular number $\underline{m}$ of bits (words of size $\underline{m}$), where $\underline{m}$ is an integer greater than or equal to 1. The current intermediate value $X_\alpha$ comprises $\underline{m}$ bits (vector of size $\underline{m}$).

Examples of the application AT are described below, in particular with reference to FIGS. 2 to 12 (in which the application AT is an encryption/decryption module) and FIG. 14 (in which the application AT is a preconditioning module of a cryptographic hashing device).

Referring to FIG. 1B, the principal means and the principal steps executed respectively in the pseudo-random generator 1 and in the pseudo-random generation method of one particular implementation of the invention are described below with reference to FIG. 1B.

On the first iteration, the pseudo-random generator 1 calculates a first value $V_1$ of the state vector V as a function of a first input word $U_1$ (using the current intermediate value $X_\alpha$) and the initial value $V_0$ of the state vector.

By extension, on the $n^{th}$ iteration, the pseudo-random generator 1 calculates a current value $V_n$ of the state vector V as a function of a current input word $U_n$ (using the current intermediate vector $X_\alpha$) and the preceding value $V_{n-1}$ of the state vector.

In this example, the pseudo-random generator 1 includes transmission means 321, reception means 323, and calculation means 325*a*, 325*b*, 325*c*, 326, and 327.

On each iteration (for example on iteration $\underline{n}$), the transmission means 321 send the application AT the preceding value $V_{n-1}$ of the state vector. The reception means 323 receive from the application AT the current intermediate value $X_\alpha$.

First calculation means 325*a* replace a section $X_{n-1}$ of size $\underline{m}$ of the preceding value $V_{n-1}$ of the state vector with the current intermediate value $X_\alpha$ to form a current value of a first intermediate state vector $V_{int1}$.

In the example described here, second calculation means 325*b* form a current value of a provisional vector $V_{prov}$ of size k1 greater than or equal to $\underline{k}$ from the current value of the first intermediate state vector $V_{int1}$ and the current value of the complementary vector, written $\overline{V_{int1}}$, of the first intermediate state vector $V_{int1}$ (i.e. in the sense of the invention the provisional vector $V_{prov}$ comprises the vectors $V_{int1}$ and $\overline{V_{int1}}$). As known in the art, the complementary vector of a vector is obtained by complementing to 1 each bit of that vector.

Here the current value of the provisional vector obtained in that way is:

$$V_{prov} = (\overline{V_{int1}} V_{int1})$$

The provisional vector is then of size k1=2k.

Figure 3A:
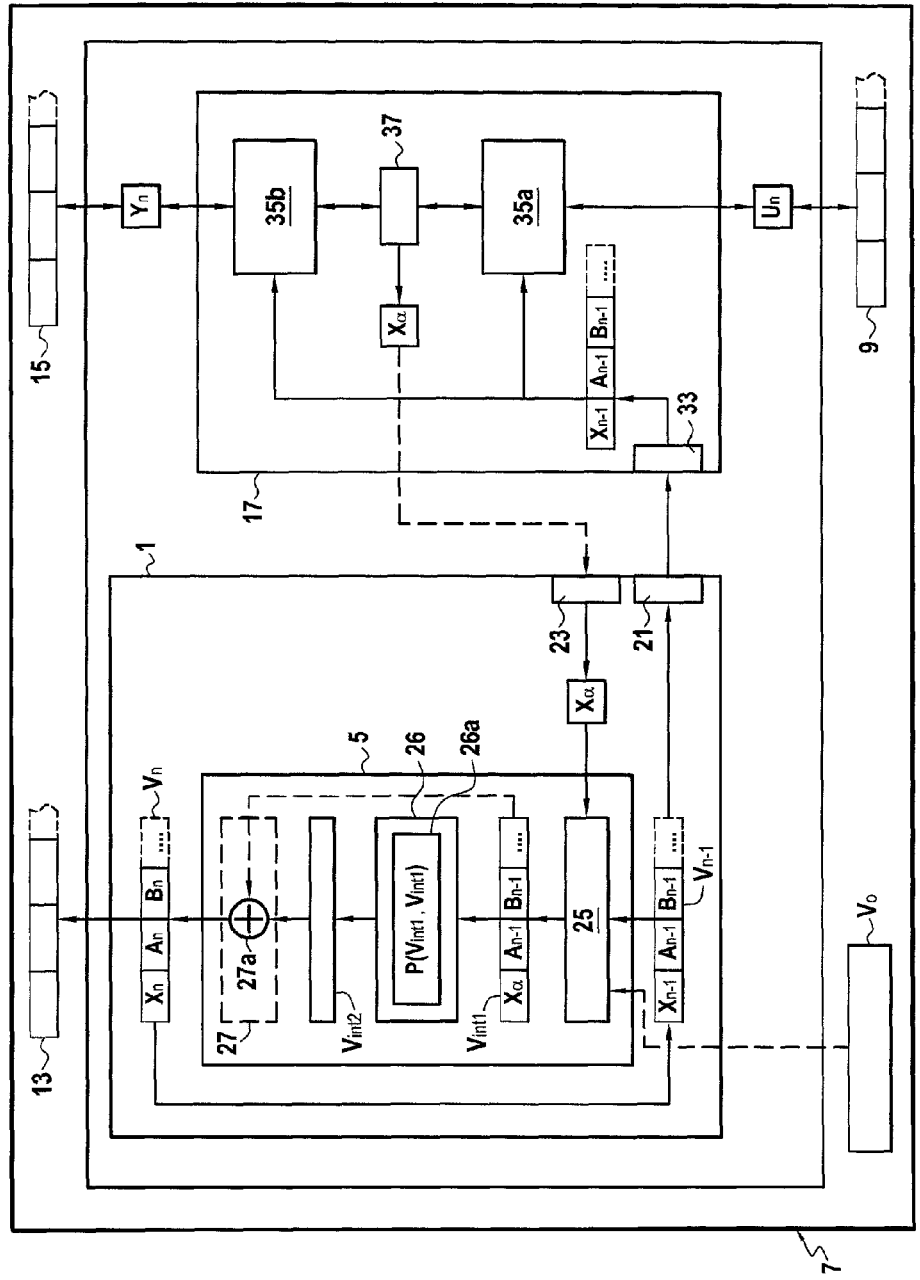

Alternatively, this provisional vector can be equal to $V_{int1}$ (i.e. the second calculation means 325*b* can be dispensed with) and is then of size $\underline{k}$. An embodiment corresponding to such an option is represented in FIG. 3A in particular and described in more detail below.

The current value of the provisional vector is then supplied to third calculation means 326 comprising surjective permutation means 326*a* adapted to apply a one-way function to the current value of the provisional vector to produce the current value of a result vector $V_{res}$. The one-way function applied by the surjective permutation means 326*a* is based on the configurable permutation function P described above with its parameters set by a permutation key C of predetermined size $\underline{d}$ (i.e. p=d) less than or equal to $\underline{k}$. Here the choice made is d=k.

The current value of the permutation key C of the one-way function is formed by formation means 326*b* from the current value of the first intermediate state vector. In the example described here, the current value C is taken as equal to the current value of the first intermediate state vector, $C=V_{int1}$.

Below, for simplicity, C and the term "key" are used interchangeably for the current value of the permutation key for iteration $\underline{n}$ and the permutation key itself (i.e. the random variable).

Alternatively, in another embodiment of the invention, the size of the key $\underline{d}$ can be strictly less than $\underline{k}$. The permutation key C is then formed by the means 326*b* selecting $\underline{d}$ distinct bits, consecutive or otherwise, from the $\underline{k}$ bits of the first intermediate vector $V_{int1}$, the positions of the selected $\underline{d}$ bits preferably being predefined and fixed. The size $\underline{d}$ of the permutation key is preferably made greater than the size of the intermediate current value $X_\alpha$ and the selected $\underline{d}$ bits preferably comprise the current intermediate value $X_\alpha$.

Here the one-way function applied by the surjective permutation means 326*a* is therefore the result of applying d=k successive permutations of size k1=2k (i.e. e=k1=2k), each permutation being associated with a distinct bit of the permutation key $C=V_{int1}$ and chosen as a function at least of the value of this bit (for example in a predefined permutation table, as described below with reference to FIGS. 10*a* and 10*b*). Alternatively, it can also depend on the permutation stage concerned.

P defines a one-way function because the permutation key $C=V_{int1}$ depending on the data to which the permutation function P is applied (since $V_{prov}=(\overline{V_{int1}}V_{int1})$). The result vector $V_{res}$ obtained after this application step is of size k1=2k.

In the sense of the invention the calculation means 326 therefore consist of a cryptographic module.

In the embodiment described here, the calculation means 5 of the pseudo-random generator 1 further include fourth calculation means 325*c* that select a section of $\underline{k}$ bits from the k1 bits of the current value of the result vector $V_{res}$ to form the current value of a second intermediate vector $V_{int2}$. For example, the second intermediate vector $V_{int2}$ is formed by the first $\underline{k}$ bits of the result vector $V_{res}$.

Moreover, the calculation means 5 of the pseudo-random generator 1 here further include fifth calculation means 327 including an exclusive-OR gate 327*a* combining the preceding value $V_{n-1}$ of the state vector and the current value of the second intermediate state vector $V_{int2}$. In addition to being non-reversible, this exclusive-OR operation confers a greater spread on the pseudo-random generator 1.

In another embodiment of the invention, the exclusive-OR gate 327a of the fifth calculation means 327 combines the current value of the second intermediate state vector $V_{int2}$ with the current value of the first intermediate state vector $V_{int1}$.

In a further embodiment of the invention, the current value $V_n$ of the state vector V corresponds to the current value of the second intermediate state vector $V_{int2}$.

After the above operations of iteration n, the current value $V_n$ of the state vector V is available for the next iteration n+1.

In the example represented in FIG. 1B, the current intermediate value $X_\alpha$ replaces a section $X_{n-1}$ consisting of m consecutive bits of the preceding value $V_{n-1}$ of the state vector to form a current value of a first intermediate state vector $V_{int1}$. This assumption is not limiting on the invention, however, and it is of course equally possible to replace the m bits of a section $X_{n-1}$ of $V_{n-1}$ occupying m particular positions, not necessarily consecutive, in the state vector, by the m components of the current intermediate value $X_\alpha$ to form a current value of a first intermediate state vector $V_{int1}$.

Encryption Method and Device

FIGS. 2 to 12 show that the pseudo-random generator 1 represented diagrammatically in FIG. 1A (a particular implementation of which is shown by way of example in FIG. 1B) can be used in combination with an encryption/decryption module to encrypt and/or decrypt a succession of input words. Note that FIGS. 2 to 12 also illustrate the principal steps of the method of encrypting an input data sequence. In this situation, the current intermediate value $X_\alpha$ can be calculated by the encryption/decryption module by an application independent of that of the pseudo-random generator.

Figure 2:
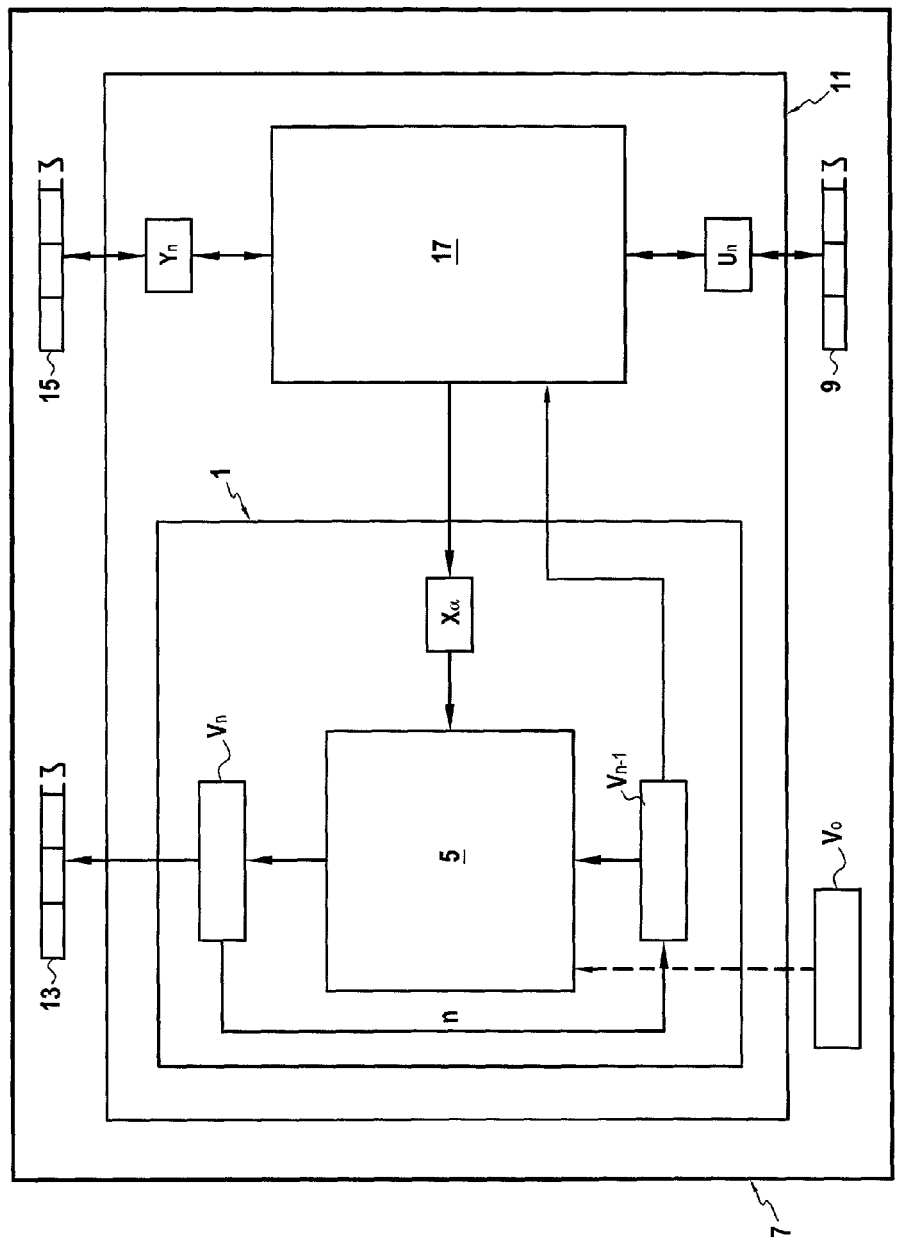
FIGS. 2 to 8 show diagrammatically examples of a device of particular embodiments of the invention for encrypting an input data sequence.

FIG. 2 shows a device 7 for encrypting (and/or decrypting) an input data sequence 9 (respectively 15) in one particular embodiment of the invention. This device 7 includes generation means 11 for iteratively generating a succession of values 13 of a state vector and a succession of output words 15 (respectively 9) from an initial value $V_0$ of the state vector and a succession of input words $U_n$ (respectively $Y_n$) forming the input sequence.

The state vector V comprises a predetermined number k of bits and the initial value $V_0$ of the state vector corresponds to a configurable encryption/decryption key of size k. The size k of the encryption/decryption key corresponds to the number of bits of the key and thus to the number of bits of the state vector V.

Moreover, an input or output word $U_n/Y_n$ is of a size m corresponding to the number of bits that are encrypted or decrypted by the encryption/decryption module 17 on each iteration. These values k and m can be predefined.

Embodiments in which the size of an input or output word can be variable are described in detail below with reference to FIGS. 7 and 8.

In the example envisaged here, the generation means 11 include a pseudo-random generator 1 of the invention as shown in FIG. 1A (for example the pseudo-random generator from FIG. 1B) and an encryption/decryption module 17. Alternatively, other pseudo-random generators can be used to implement the encryption device and method of the invention, for example a pseudo-random generator based on the advanced encryption standard (AES) algorithm, a pseudo-random generator based on the Blum Blum Shub (BBS) algorithm, or a pseudo-random generator based on shift registers known to the person skilled in the art.

Accordingly, on each iteration n, the pseudo-random generator 1 calculates a current value $V_n$ of the state vector by a non-invertible application depending on the preceding value $V_{n-1}$ of the state vector and the current intermediate value $X_\alpha$ produced by a calculation carried out by the encryption/decryption module 17 and depending on the preceding value $V_{n-1}$ of the state vector and the current input word $U_n$ (respectively $Y_n$), and the encryption/decryption module 17 calculates a current output word $Y_n$ (respectively $U_n$) by a reversible application depending on a current input word $U_n$ (respectively $Y_n$) and the preceding value $V_{n-1}$ of the state vector.

Note that the encryption device 7 can be used reversibly for encryption and/or decryption. As described above, the encryption method of the invention can be used in encryption mode when the sequence of input words is from a message in clear to be encrypted or in decryption mode when the sequence of output words is from an encrypted message to be decrypted.

In the present example, on each iteration n the pseudo-random generator 1 feeds the state vector with the current intermediate value $X_\alpha$ produced by a calculation carried out by the encryption/decryption module 17 and depending on the preceding value $V_{n-1}$ of the state vector and the current input word $U_n$ (respectively $Y_n$).

As described above, the pseudo-random generator 1 uses a non-invertible application based on a one-way function with parameters set by a permutation key and can be used to perform encryption and decryption in the same way. Moreover, the encryption/decryption module 17 is reversible and can therefore be used with the encryption/decryption operations effected in reverse order. Thus, during encryption, an input word is written $U_n$ (data in clear) and an output word is written $Y_n$ (encrypted data), while during decryption an input word is written $Y_n$ (encrypted data) and an output word is written $U_n$ (data in clear).

More specifically, before starting encryption by the encryption method of the invention, the value of the encryption key becomes the initial value $V_0$ of the state vector V ($V_0$=encryption key).

On the first iteration, the encryption/decryption module 17 calculates the first output word $Y_1$ (corresponding to an encrypted word) as a function of the first input word $U_1$ (corresponding to a word in clear) and the initial value $V_0$ of the state vector. Moreover, the pseudo-random generator 1 calculates a first vector $V_1$ of the state vector V as a function of the first input word $U_1$ and the initial value $V_0$ of the state vector. By extension, on the $n^{th}$ iteration, the encryption/decryption module 17 calculates the current output word $Y_n$ as a function of the current input word $U_n$ and the preceding value $V_{n-1}$ of the state vector. Moreover, the pseudo-random generator 1 calculates a current value $V_n$ of the state vector V as a function of the current input word $U_n$ and the preceding value $V_{n-1}$ of the state vector.

In the same manner, before starting decryption by the encryption method of the invention, the value of the decryption key becomes the initial value $V_0$ of the state vector V ($V_0$=decryption key). The decryption key is naturally taken as equal to the encryption key used to encrypt the data (symmetrical encryption).

On the first iteration of the decryption process, the encryption/decryption module 17 calculates the first output word $U_1$ (corresponding to a decrypted word) as a function of the first input word $Y_1$ (corresponding to a encrypted word) and the initial value $V_0$ of the state vector. Moreover, the pseudo-random generator 1 calculates a first value $V_1$ of the state vector V as a function of the first input word $Y_1$ and the initial value $V_0$ of the state vector. By extension, on the $n^{th}$ iteration the encryption/decryption module 17 calculates the current output word $U_n$ as a function of the current input word $Y_n$ and the preceding value $V_{n-1}$ of the state vector. Moreover, the pseudo-random generator 1 calculates a current value $V_n$ of the state vector V as a function of the current input word $Y_n$ and the preceding value $V_{n-1}$ of the state vector.

In the example described here, the state vector V advantageously includes a set of sections comprising at least a first state variable X, a second state variable A, a third state variable B, and possibly other state variables. These state variables are therefore pseudo-random variables. For example, the current value $V_n$ of the state vector V can be structured in the following manner:

$$V_n = (\ldots (X_n = (x_{n1} \ldots x_{nm})) \ldots (A_n = (a_{n1} \ldots a_{nm})) \ldots (B_n = (b_{n1} \ldots b_{nm})) \ldots)$$

The values of the state variables X, A, and B will also be considered as sections of the state value or of the value of the state vector in the sense of the invention.

In this example, the state variables X, A, and B are sections each consisting of $\underline{m}$ consecutive bits. The current value $X_n$ of the first state variable X comprises $\underline{m}$ bits $X_{n1}, \ldots, X_{nm}$, the current value $A_n$ of the second state variable A comprises $\underline{m}$ bits $A_{n1}, \ldots, A_{nm}$, and the current value $B_n$ of the third state variable B comprises $\underline{m}$ bits $B_{n1}, \ldots, B_{nm}$.

More specifically, the value $X_n$ of the first state variable X is used in the next iteration by functions (respectively means) referred to as "isolation" functions (respectively means) of the encryption/decryption module 17 before being replaced by the intermediate value $X_\alpha$ produced by the calculation effected in the next iteration by the encryption/decryption module 17. The values $A_n$ and $B_n$ of the second and third state variables are also used during the next iteration by the isolation functions of the encryption/decryption module 17 (see for example FIGS. 3A and 3B).

The state variables are preferably located at a fixed position, but it is possible to assign them a position variable as a function of the value or values taken by one or more sections of the state vector, themselves at fixed positions. Only the solution of a fixed position of the state variables is described below.

Moreover, it is preferable (although not necessary) for the sectors assigned to each of the state variables not to overlap. The size $\underline{k}$ of the state vector is therefore chosen accordingly and each state variable corresponds to a section of limited size of the state vector (i.e. of a size strictly less than that of the state vector).

FIG. 3A shows in more detail a first example of an encryption/decryption device 7 from FIG. 2.

In this first example, the pseudo-random generator 1 includes transmission means 21, reception means 23, and calculation means 25, 26, and possibly 27.

On each iteration (for example on iteration $\underline{n}$), the transmission means 21 send the encryption/decryption module 17 the preceding value $V_{n-1}$ of the state vector comprising at least the preceding value $X_{n-1}$ of the first state variable X, the preceding value $A_{n-1}$ of the second state variable A, and the preceding value $B_{n-1}$ of the third state variable B.

The reception means 23 receive from the encryption/decryption module 17 the current intermediate value $X_\alpha$.

First calculation means 25 replace the preceding value $X_{n-1}$ of the first state variable X by the current intermediate value $X_\alpha$ to calculate a current value of a first intermediate state vector $V_{int1}$.

Second calculation means 26 comprise surjective permutation means 26a adapted to apply to the first intermediate state vector $V_{int1}$ a one-way function with parameters set by a permutation key C of size d=k comprising the current value of the first intermediate vector $V_{int1}$ (C=$V_{int1}$) to form the second intermediate state vector $V_{int2}$. The second calculation means 26 function in a similar way (apart from the size of the vectors) to the calculation means 326 described above and constitute a cryptographic module in the sense of the invention.

The one-way function applied by the calculation means 26a is based on the configurable permutation function P described above (p=d=k and e=k) and therefore is here the result of applying $\underline{k}$ successive permutations of size $\underline{k}$, each permutation being associated with a distinct bit of the permutation key C=$V_{int1}$ and chosen as a function at least of the value of that bit.

Accordingly, the means 26a apply the one-way function P=($V_{int1}$, $V_{int1}$) with parameters set by the current value of the first intermediate state vector $V_{int1}$ to the first intermediate state vector to form a current value of a second intermediate state vector $V_{int2}$. In this first example, in the sense of the invention, the first intermediate value, respectively the second intermediate value, therefore represents a provisional vector, respectively a result vector. Note that the vectors $V_{int1}$ and $V_{int2}$ are both of size $\underline{k}$. The current value $V_n$ of the state vector V therefore corresponds to the current value of the second intermediate state vector $V_{int2}$.

In another variant (represented in dashed line in FIG. 3A), the calculation means 5 of the pseudo-random generator 1 further include third calculation means 27 including an exclusive-OR gate 27a combining the current value of the first intermediate state vector $V_{int1}$ and the current value of the second intermediate state vector $V_{int2}$.

In another variant (not shown), the third calculation means 27 include an exclusive-OR gate 27a combining the preceding value of the state vector $V_{n-1}$ and the current value of the second intermediate state vector $V_{int2}$.

Thus the calculation means 5 of the pseudo-random generator 1 execute a one-way, (i.e. non-invertible) function on the first intermediate state vector $V_{int1}$ the result of which is optionally combined with this first intermediate state vector $V_{int1}$ or with the state vector in the preceding iteration.

After the above operations of iteration $\underline{n}$, the current value $V_n$ of the state vector V is available for the next iteration n+1.

Moreover, the encryption/decryption module 17 includes reception means 33, isolation means 35a and 35b and, in the example described here, connection means 37 between the isolation means 35a and 35b.

The reception means 33 receive from the pseudo-random generator 1 the preceding value $V_{n-1}$ of the state vector comprising at least the preceding value $X_{n-1}$ of the first state variable X, the preceding value $A_{n-1}$ of the second state variable A, and the preceding value $B_{n-1}$ of the third state variable B.

The isolation means comprise at least two isolation means 35a and 35b for isolating the current intermediate value $X_\alpha$.

The isolation means apply a symmetrical "secret key" function, the secret key being obtained from at least one section of the preceding value of the state vector. As the person skilled in the art knows, a symmetrical secret key function is one for which calculating the output as a function of the input and the input as a function of the output is easy if the secret key is available and impossible if the secret key is not known.

The secret key functions used preferably include at least one exclusive-OR operation, i.e. the isolation means include at least one exclusive-OR gate. They can further include bijective permutation means.

In the example described here (see FIG. 5A), the isolation means each include an exclusive-OR gate and two bijective permutation means and the connection means 37 include an exclusive-OR gate. The secret key function used in each isolation means in the sense of the invention is thus made up of two bijective permutations and one exclusive-OR operation, each with parameters set by a section of size $\underline{m}$ of the state vector $V_{n-1}$. The secret key of this function is made up of the section setting the parameters of the first bijective permutation, the section setting the parameters of the exclusive-OR operation, and the section setting the parameters of the second bijective permutation.

Thus the encryption device 7 includes two interconnected elements, namely a pseudo-random generator 1 with parameters set by an encryption/decryption key of any size $\underline{k}$ used to initialize the state vector V and an encryption-decryption module 17 incorporating secret key isolation functions.

Figure 3B:
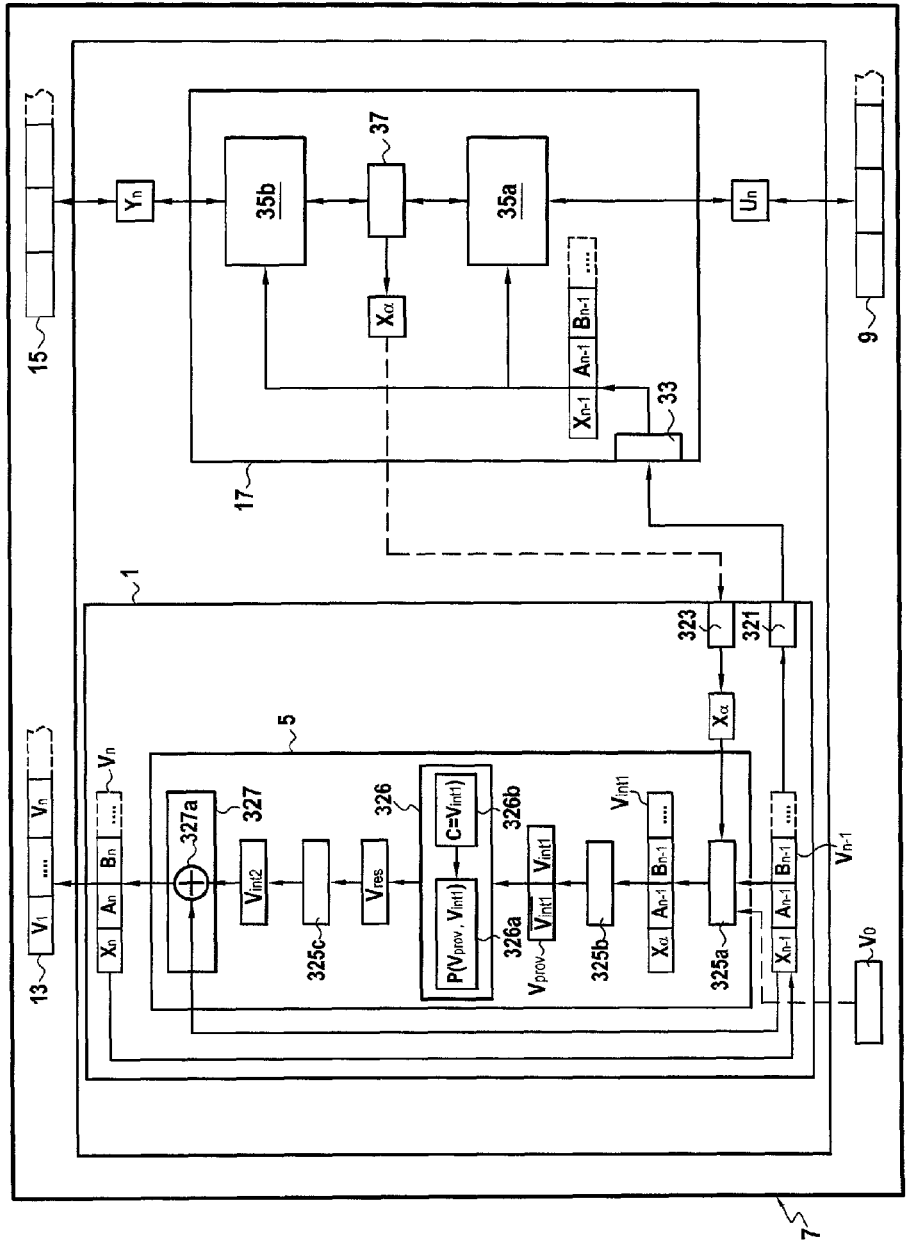

FIG. 3B shows a second example of an encryption device 7 from FIG. 2 using the pseudo-random generator 1 represented in FIG. 1B. The mode of operation of this device 7 and the associated variants are similar to those described above with reference to FIG. 3A.

Figure 5A:
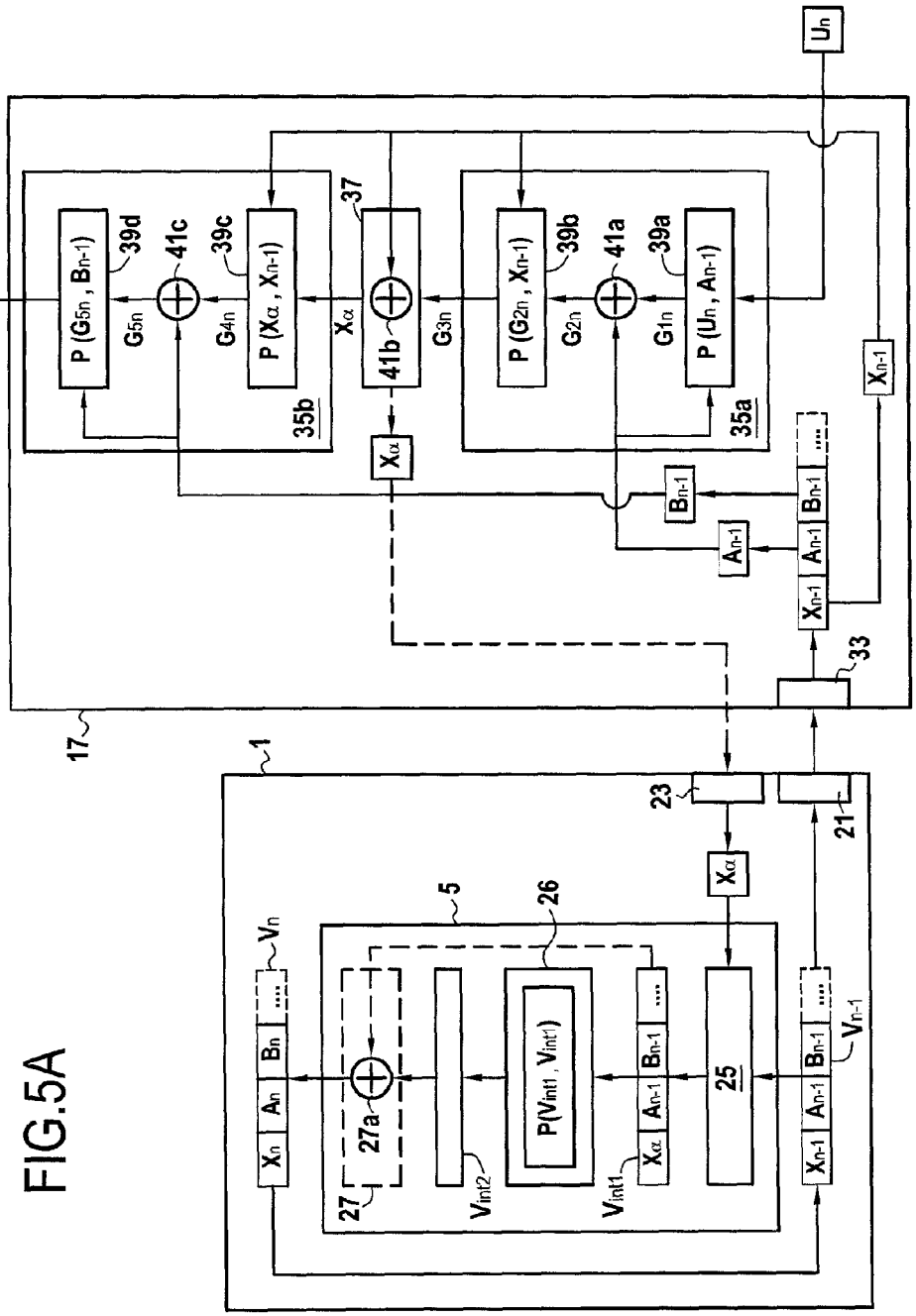
Figure 6A:
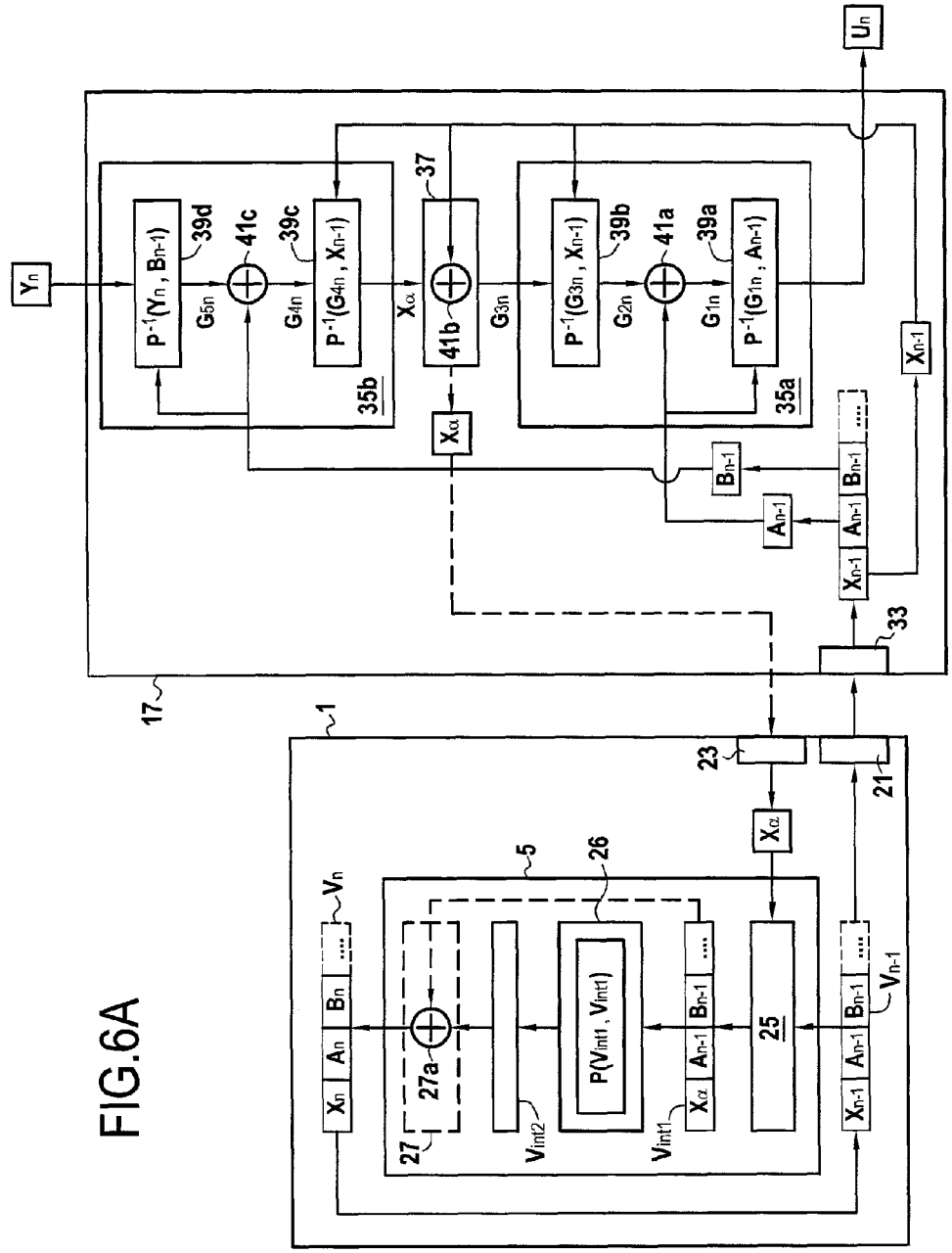

FIGS. 5A and 6A show in more detail ways of encrypting and decrypting an input data sequence when the FIG. 3A pseudo-random generator 1 is used.

More specifically, FIG. 5A shows the encryption device 7 in an encryption mode in which the input data sequence corresponds to a message in clear and the succession of output words corresponds to an encrypted message. In the present example, the connection means 37 between the first isolation means 35a and the second isolation means 35b includes a central exclusive-OR gate 41b.

The first isolation means 35a include first and second bijective permutation means 39a, 39b separated by a first exclusive-OR gate 41a. The second isolation means 35b include third and fourth bijective permutation means 39c, 39d separated by a second exclusive-OR gate 41c.

The bijective permutation means 39a, 39b, 39c, 39d considered here each implement the permutation function P described above with parameters set by a state variable of the state vector $V_{n-1}$, i.e. by a permutation key of size $\underline{m}$ (p=m) equal to a state variable of the state vector $V_{n-1}$. Accordingly:

the first bijective permutation means 39a implement a first bijective permutation corresponding to the permutation function P with parameters set by a permutation key equal to the preceding value of the second state variable $A_{n-1}$;

the second bijective permutation means 39b implement a second bijective permutation corresponding to the permutation function P with parameters set by a permutation key equal to the preceding value of the first state variable $X_{n-1}$;

the third bijective permutation means 39c implement a third bijective permutation corresponding to the permutation function P with parameters set by a permutation key equal to the preceding value of the first state variable $X_{n-1}$; and the fourth bijective permutation means 39d implement a fourth bijective permutation corresponding to the permutation function P with parameters set by a permutation key equal to the preceding value of the third state variable $B_{n-1}$.

The permutation keys used to set the parameters of the permutation function P in the bijective permutation means 39a, 39b, 39c, and 39d being independent of the data to which the resulting permutation function P is applied, each therefore implements an invertible (bijective) function the invert function of which is a permutation function $P^{-1}$. This invertible function P is the result of applying $\underline{m}$ successive permutations of size $\underline{m}$ (p=e=m) selected as a function of the value of each bit of the permutation key concerned.

Thus, in this encryption mode, calculating a current output word $Y_n$ during an iteration $\underline{n}$ includes the following operations.

The first permutation means 39a calculate a first intermediate word $G_{1n}$ by applying the first bijective permutation to a pair consisting of the current input word $U_n$ and a preceding value $A_{n-1}$ of the second state variable: $G_{1n}=P(U_n, A_{n-1})$. In other words, the first permutation means 39a calculate the first intermediate word $G_{1n}$ by applying to the current input word $U_n$ the bijective permutation function P with parameters set by $A_{n-1}$.

The first exclusive-OR gate 41a calculates a second intermediate word $G_{2n}$ by applying an exclusive-OR operation to the first intermediate word $G_{1n}$ and the preceding value $A_{n-1}$ of the second state variable: $G_{2n}=G_{1n}\oplus A_{n-1}$.

The second permutation means 39b calculate a third intermediate word $G_{3n}$ by applying the second bijective permutation to a pair consisting of the second intermediate word $G_{2n}$ and the preceding value $X_{n-1}$ of the first state variable: $G_{3n}=P(G_{2n},X_{n-1})$. In other words, the second calculation means 39b calculate the third intermediate word $G_{3n}$ by applying the bijective permutation function P with parameters set by $X_{n-1}$ to the second intermediate word $G_{2n}$.

The central exclusive-OR gate 41b calculates the current intermediate value $X_\alpha$ by applying an exclusive-OR operation to the third intermediate word $G_{3n}$ and the preceding value $X_{n-1}$ of the first state variable: $X_\alpha=G_{3n}\oplus X_{n-1}$. This current intermediate value $X_\alpha$ is then sent to the pseudo-random generator 1.

The third permutation means 39c then calculate a fourth intermediate word $G_{4n}$ by applying the third bijective permutation to a pair consisting of the current intermediate value $X_\alpha$ and the preceding value $X_{n-1}$ of the first state variable: $G_{4n}=P(X_\alpha, X_{n-1})$. In other words, the third permutation means 39c calculate the fourth intermediate word $G_{4n}$ by applying the bijective permutation function P with parameters set by $X_{n-1}$ to the current intermediate value $X_\alpha$.

The third exclusive-OR gate 41c calculates a fifth intermediate word $G_{5n}$ by applying an exclusive-OR operation to the fourth intermediate word $G_{4n}$ and the preceding value $B_{n-1}$ of the third state variable: $G_{5n}=G_{4n}\alpha B_{n-1}$.

Finally, the fourth permutation means 39d calculate the current output word $Y_n$ by applying the fourth bijective permutation to a pair formed by the fifth intermediate word $G_{5n}$ and a preceding value $B_{n-1}$ of the third state variable: $Y_n=P(G_{5n}, B_{n-1})$. In other words, the fourth permutation means 39d calculate the current output word $Y_n$ by applying the bijective permutation function P with parameters set by $B_{n-1}$ to the fifth intermediate word $G_{5n}$.

FIG. 6A shows the encryption device as used in a decryption mode in which the input data sequence corresponds to an encrypted message and the succession of output words corresponds to a message in clear.

In this decryption mode the calculation of a current output word $U_n$ in an iteration $\underline{n}$ includes the following operations.

The fourth permutation means 39d calculate a fifth intermediate word $G_{5n}$ by applying a permutation that is the reverse of the fourth bijective permutation to a pair formed by a current input word $Y_n$ and the preceding value $B_{n-1}$ of the third state variable: $G_{5n}=P^{-1}(Y_n, B_{n-1})$.

The third exclusive-OR gate 41c calculates a fourth intermediate word $G_{4n}$ by applying an exclusive-OR operation to the fifth intermediate word $G_{5n}$ and the preceding value $B_{n-1}$ of the third state variable: $G_{4n}=G_{5n} \oplus B_{n-1}$.

The third permutation means 39c calculate the current value $X_\alpha$ by applying a permutation that is the reverse of the third bijective permutation to a pair formed by the fourth intermediate word $G_{4n}$ and the preceding value $X_{n-1}$ of the first state variable: $X_\alpha = P^{-1}(G_{4n}, X_{n-1})$. This current intermediate value $X_\alpha$ is then sent to the pseudo-random generator.

The center exclusive-OR gate 41b calculates a third intermediate word $G_{3n}$ by applying an exclusive-OR operation to the current intermediate value $X_\alpha$ and the preceding value $X_{n-1}$ of the first state variable: $G_{3n}=X_\alpha \oplus X_{n-1}$.

The second permutation means 39b calculate a second intermediate word $G_{2n}$ by applying a permutation that is the reverse of the second bijective permutation to a pair formed by the third intermediate word $G_{3n}$ and the preceding value $X_{n-1}$ of the first state variable: $G_{2n} = P^{-1}(G_{3n}, X_{n-1})$.

The first exclusive-OR gate 41a calculates a first intermediate word $G_{1n}$ by applying an exclusive-OR operation to the second intermediate word $G_{2n}$ and the preceding value $A_{n-1}$ of the second state variable: $G_{1n}=G_{2n} \oplus A_{n-1}$.

Finally, the first permutation means 39a calculate the current output word $U_n$ by applying a permutation that is the reverse of the first bijective permutation to a pair formed by the first intermediate word $G_{1n}$ and the preceding value $A_{n-1}$ of the second state variable: $U_n = P^{-1}(G_{1n}, A_{n-1})$.

Accordingly, in the FIGS. 5A and 6A examples, the isolation functions or means 35a and 35b are each made up of two permutation functions (bijective permutations in the sense of the invention) with parameters set by $A_{n-1}$ and $X_{n-1}$ for the first isolation means 35a and by $B_{n-1}$ and $X_{n-1}$ for the second isolation means 35b, and an exclusive-OR operation with $A_{n-1}$ for the first isolation means 35a and with $B_{n-1}$ for the second isolation means 35b. The current intermediate value $X_\alpha$ is therefore isolated from the input and output words (i.e. not accessible from the input and output words) in the middle of four permutation functions with parameters set by $A_{n-1}$, $X_{n-1}$, and $B_{n-1}$, and three exclusive-OR operations with the state variables $A_{n-1}, X_{n-1}$, and $B_{n-1}$ of the state vector V, which is itself isolated from the inputs and outputs. This amounts to self-isolation of the state vector V.

Figure 5B:
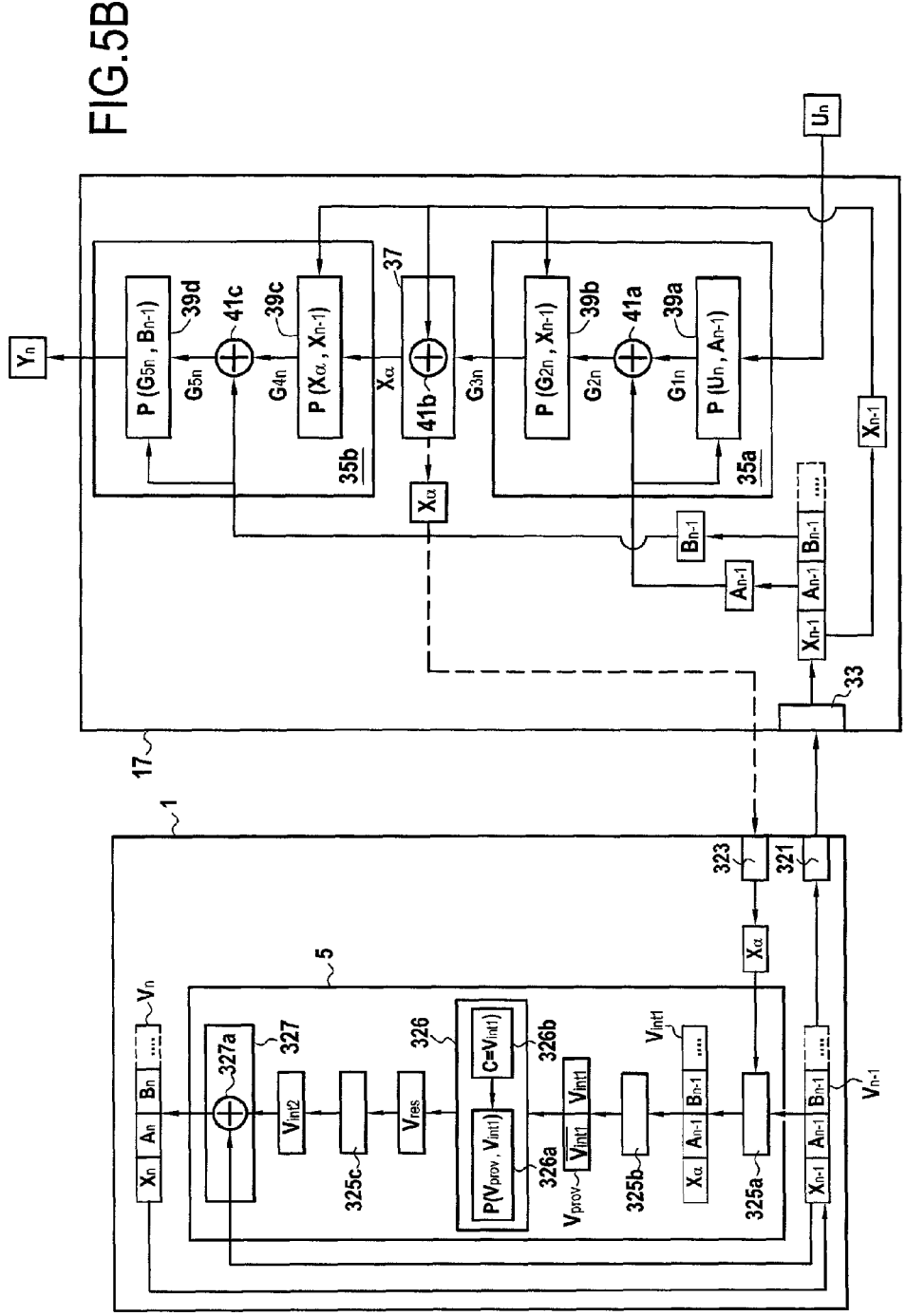

FIGS. 5B and 6B show in a similar way modes for encrypting and decrypting an input data sequence using the FIG. 3B pseudo-random generator 1. Alternatively, other state pseudo-random generators could be used.

Moreover, in one embodiment, the complexity of the encryption/decryption operations can be further increased by replacing each of the state variables $A_n$, $B_n$, and $X_n$ by two sub-variables of identical size (sections in the sense of the invention), respectively $A_n'$ and $A_n''$ for $A_n$, $B_n'$ and $B_n''$ for $B_n$ and $X_n'$, and $X_n''$ for $X_n$. The sub-variables $A_n'$, $B_n'$, and $X_n'$ can be used to set the parameters of the permutations P and $P^{-1}$ and the sub-variables $A_n''$, $B_n''$, and $X_n''$ can be used to calculate the exclusive-OR operations.

In another embodiment, the respective state sub-variables $A_n'$ and $A_n''$ for $A_n$, $B_n'$, and $B_n''$ for $B_n$ and $X_n'$, and $X_n''$ for $X_n$ can be non-contiguous and each of size $\underline{m}$. For example:

$$V_n = (X'_n A'_n B'_n X''_n A''_n B''_n \ldots)$$

In a further embodiment, each state variable can include $\underline{m}$ not necessarily consecutive bits of the state vector V occupying predetermined positions, for example.

Use of a Plurality of Pseudo-Random Generators in Parallel

Moreover, note that in one particular embodiment of the invention it is possible to use a plurality of generators in parallel for the same encryption/decryption module.

Figure 4:
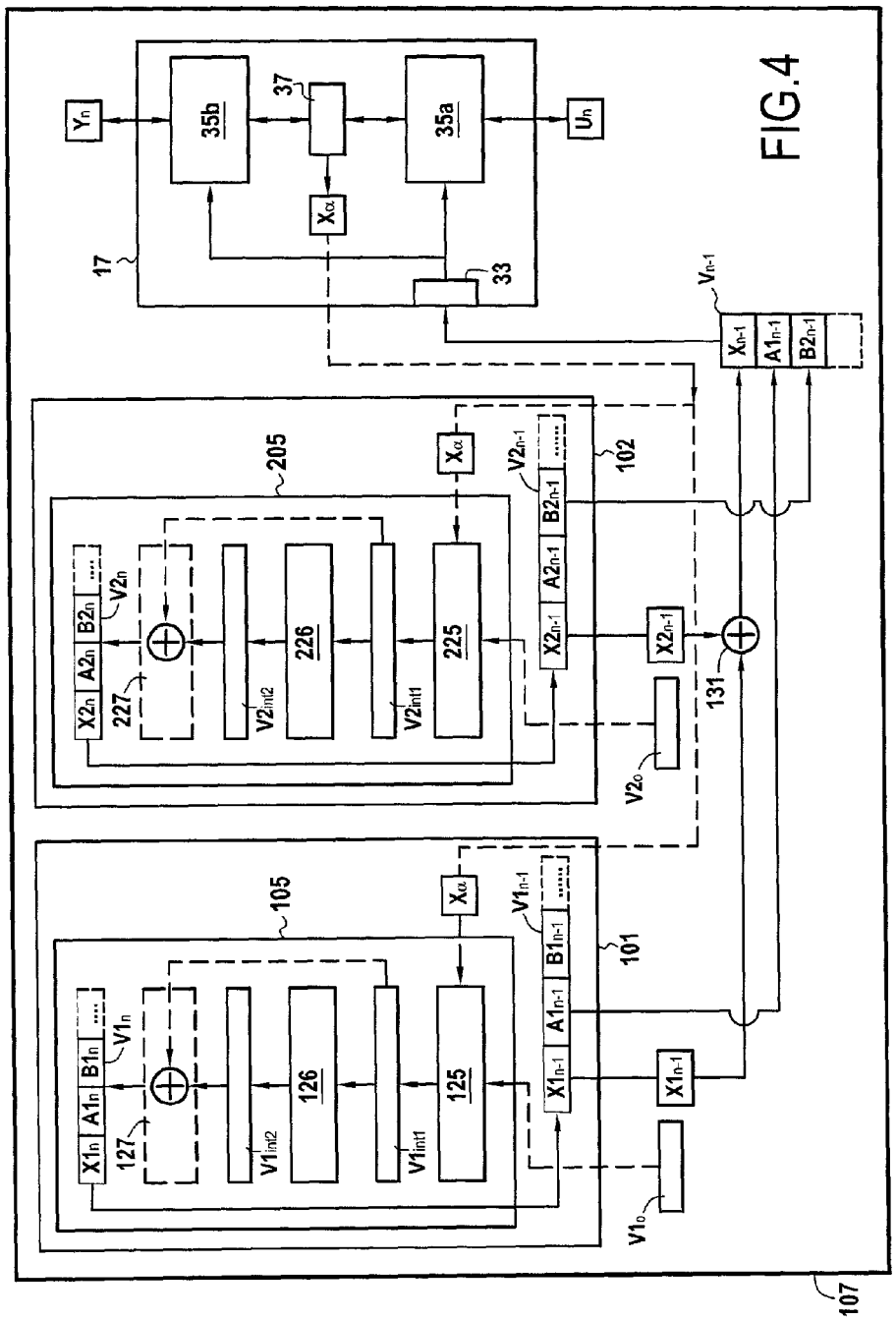

For example, FIG. 4 shows an encryption device 107 that can be used in a similar way to the encryption device 7 in encryption mode and/or in decryption mode and includes an encryption/decryption module 17 and two pseudo-random generators 101, 102 similar to that described with reference to FIG. 3a for the first embodiment (alternatively other pseudo-random generators can be considered, for example two pseudo-random generators similar to the generator shown in FIG. 3B).

The first pseudo-random generator 101 forms a first current value $V1_n$ of a first state vector V1 and the second pseudo-random generator 102 forms a second current value $V2_n$ of a second state vector V2.

The two pseudo-random generators 101, 102 can be combined in parallel by means of an exclusive-OR gate, for example. The current value $V_n$ of the state vector is then the result of an exclusive-OR operation applied to the first current value $V1_n$ of the first state vector and the second current value $V2_n$ of the second state vector. Note that any other combination is possible, for example the current value $V_n$ of the state vector coming from the two pseudo-random generators 101, 102 can be made up of a first section derived from the first current value $V1_n$ of the first state vector, a second section derived from the second current value $V2_n$ of the second state vector, and a third section derived from any combination of the corresponding sections of the first and second current values $V1_n, V2_n$ of the first and second state vectors.

More specifically, in the FIG. 4 example, the first pseudo-random generator 101 is fed a first initial value $V1_0$ and generates a first current value $V1_n$ of a first state vector V1 including at least a first current value $X1_n$ of the first state variable X1, a first current value $A1_n$ of the second state variable A1, and a first current value $B1_n$ of the third state variable B1. Moreover, the second pseudo-random generator 102 is fed a second initial value $V2_0$ and generates a second current value $V2_n$ of a second state vector V2 including at least a second current value $X2_n$ of the first state variable X2, a second current value $A2_n$ of the second state variable A2, and a second current value $B2_n$ of the third state variable B2.

In this specific example, the preceding value $V_{n-1}$ of the state vector sent to the encryption/decryption module 17 is formed by a preceding value $X_{n-1}$ of the first state variable X resulting from an exclusive-OR operation applied to the first preceding value $X1_{n-1}$ of the first state variable X1 of the first state vector and the second preceding value $X2_{n-1}$ of the first state variable X2 of the second state vector, a preceding value $A_{n-1}=A1_{n-1}$ of the second state variable A1 of the first state vector and a preceding value $B_{n-1}=B2_{n-1}$ of the third state variable B2 of the second state vector. Moreover, the two pseudo-random generators 101, 102 are fed the same current intermediate value $X_\alpha$ from the encryption/decryption module 107.

Thus, generally speaking, it is possible to implement $\underline{h}$ pseudo-random generators in parallel (i=1 to $\underline{h}$) for the same encryption/decryption module. The $\underline{h}$ pseudo-random generators are then all fed the same current intermediate value $X_\alpha$ from the encryption/decryption module. The $\underline{h}$ generators can be of the same or different sizes $k_1, \ldots, k_h$. The initial values $V1_0, \ldots, Vh_0$ can be extracted or calculated from the same common encryption/decryption key, the size of which is equal to the maximum of $k_1, \ldots, k_h$. The values of $A_n$ and $B_n$ can come from the same generator or different generators. $X_n$ can correspond to the result of combining by means of exclusive-OR operations all of the respective $Xi_n$: $X_n = X1_n \oplus X2_n \oplus \ldots \oplus Xh_n$.

Of course, the pseudo-random generators in parallel can be used independently of the encryption/decryption module to generate a pseudo-random data sequence of high quality.

Varying the Number of Bits of the Input and Output Words.

In the above examples, the state vector comprises a particular number $\underline{k}$ of bits and each output or input word comprises a particular number $\underline{m}$ of bits less than the particular number $\underline{k}$ of bits of the state vector.

In one particular embodiment of the invention, each output or input word can advantageously comprise a number $\underline{w}$ of bits that can vary on each iteration whilst remaining less than the particular number $\underline{k}$ of bits of the state vector.

Figure 7:
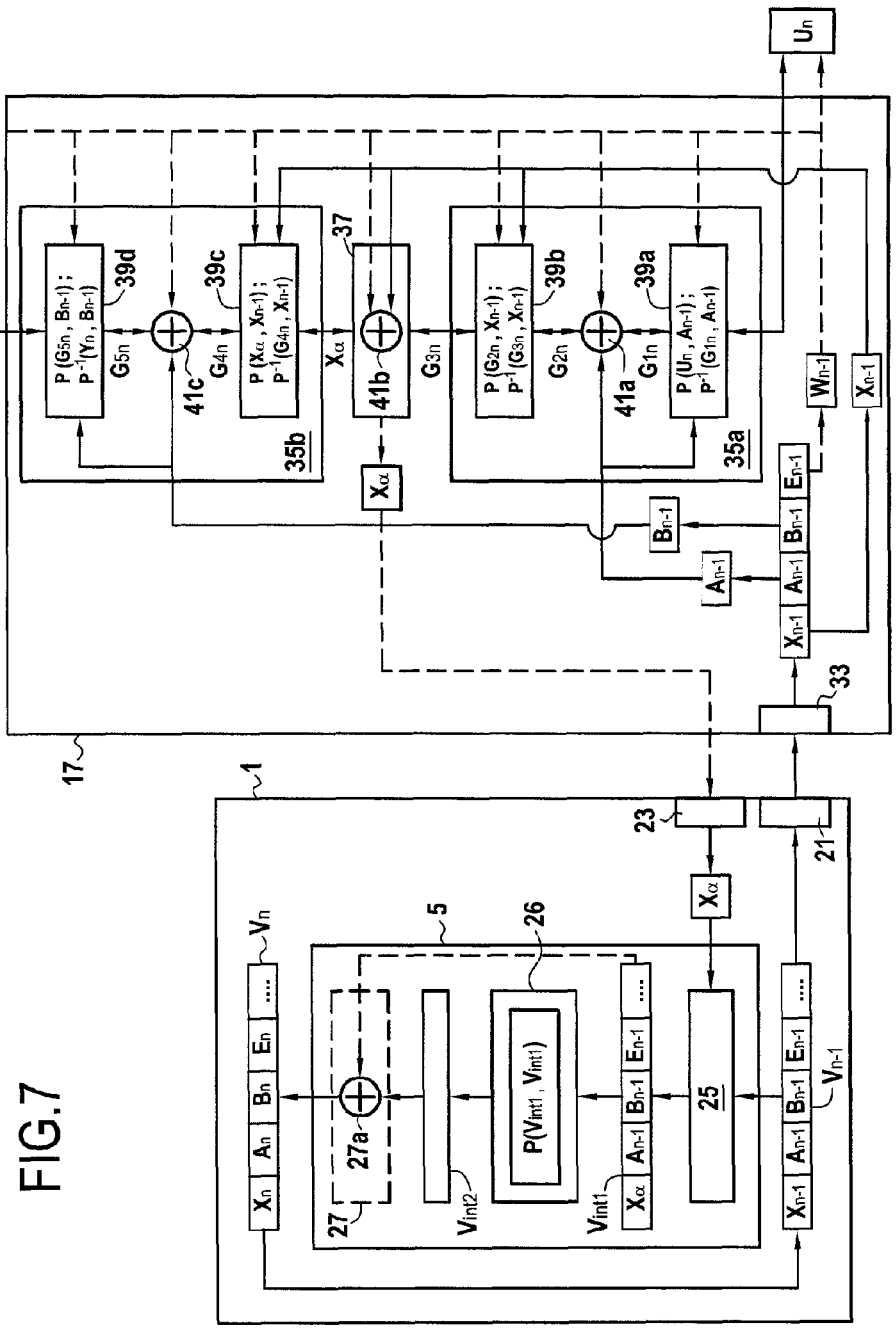

FIG. 7 shows a device for encrypting a variable number $\underline{w}$ of bits in such an embodiment of the invention. The pseudo-random generator in this figure is that shown in FIG. 3A. Of course, a different pseudo-random generator could be considered instead, for example that shown in FIG. 3B.

Here the state vector V can advantageously include a fourth state variable E indicating this number $\underline{w}$ of bits that is variable on each iteration to adapt the permutations (in particular the size $\underline{e}$ of the permutations and the number $\underline{p}$ of stages of permutation concerned) and exclusive-OR operators implemented by the permutation means and the exclusive-OR gates of the module 17 for encrypting/decrypting to this variable number $\underline{w}$.

Accordingly, the permutation functions P (for encryption), $P^{-1}$ (for decryption) and the exclusive-OR operator "⊕" used by the encryption/decryption module 17 are adaptable to input and output words $U_n/Y_n$ of any length $\underline{w}$ ($w \leq m < k$). Provided that permutation tables are predefined corresponding to all feasible values of $\underline{w}$ to implement the permutation functions P and $P^{-1}$ to effect the exclusive-OR operations on the first $\underline{w}$ bits of the state variables $A_{n-1}$, $X_{n-1}$, and $B_{n-1}$, it is possible to divide the input data into blocks of variable size $\underline{w}$ and to encrypt and/or decrypt those blocks using the encryption/decryption module 17.

The parameter indicating the number $\underline{w}$ of input bits to be encrypted and/or decrypted during iteration $\underline{n}$ is provided by the preceding value $E_{n-1}$ of the fourth state variable E. This fourth state variable E is a section of size $\underline{r}$ of the state vector isolated from the inputs and outputs and depending on the encryption/decryption key and the whole of the applied sequence of input words $U_n/Y_n$.

Accordingly, during iteration $\underline{n}$, the size $w_{n-1}$ of the block to be processed is sent to the input word $U_n/Y_n$ or the output word $Y_n/U_n$ and to the permutation means 39a-39d and to the logic gates 41a-41c to size the permutations and the exclusive-OR operations.

The number of bits encrypted on each iteration is therefore pseudo-random, depending on the encryption/decryption key and the whole of the applied sequence of input words $U_n/Y_n$. The slightest modification of the input word sequence $U_n/Y_n$ therefore systematically leads to modification of the whole of the subdivision of the data after that modification.

To extract the number $\underline{w}$ of bits to encrypt/decrypt during the iteration $\underline{n}$ from the preceding value $E_{n-1}$ of the fourth state variable E, $\underline{w}$ can be assigned the decimal value coded on the $\underline{r}$ bits of the preceding value $E_{n-1}$ of the fourth state variable: $0 \leq w \leq 2^r - 1$ ($=m$). Alternatively, $\underline{w}$ can be assigned the value of the number of bits at 1 in the preceding value $E_{n-1}$ of the fourth state variable: $0 \leq w \leq r$ ($=m$).

Note that in the example described here the initial number of bits is set to $w_0=1$ by convention and regardless of the initial value $E_0$ of the fourth state variable E. Thus only one bit is systematically encrypted/decrypted during the first iteration.

To prevent leaking of information concerning the subdivision effected (for example by observing the inputs and outputs of the encryption module) the output words $Y_n/U_n$ can advantageously be grouped to free up at the output blocks of constant length $\underline{m}$ only. The same precaution can be applied to the input words $U_n/Y_n$ in the case of decryption.

Figure 8:
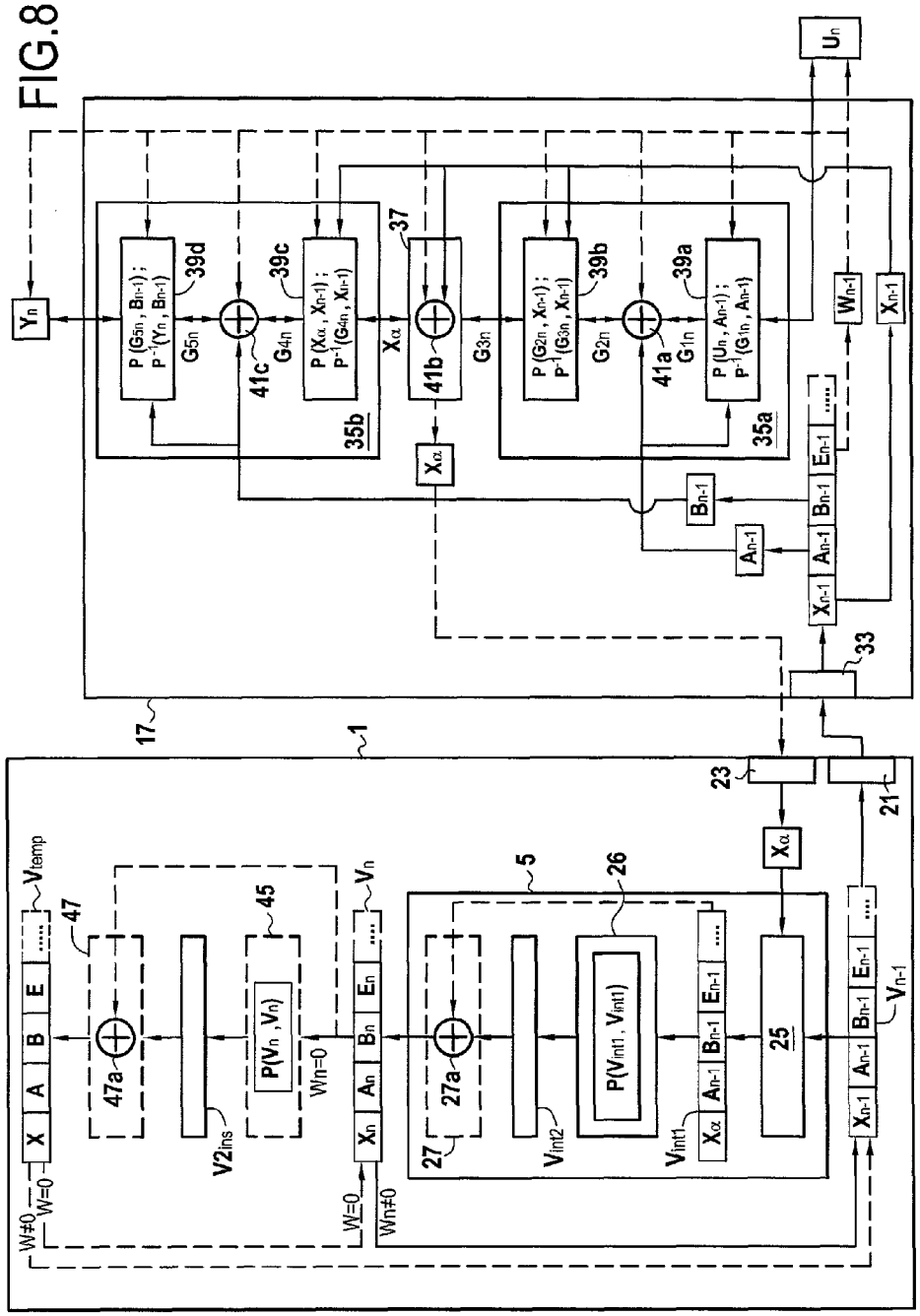

FIG. 8 shows an encryption device (which can be used for encryption and/or decryption like that shown in FIG. 7) including a pseudo-random generator 1 like that shown in FIG. 3A, which includes additional means for calculating a new current state value replacing the current value of the state vector by means of a non-invertible application depending on the current value of the state vector. These additional means enable the pseudo-random generator 1 to effect "empty" iterations on the state vector V as a function of the value $\underline{w}$ indicated by the fourth state variable E.

Thus the pseudo-random generator 1 includes fourth calculation means 45 including additional surjective permutation means. Thus the pseudo-random generation step of each iteration includes application by the fourth calculation means 45, when the variable number w is equal to zero, of a surjective permutation to the current value $V_n$ of the state vector (permutation function P with parameters set by a permutation key equal to the vector $V_n$) to form a current value of an additional second intermediate state vector $V2_{ins}$. This current value of the second additional intermediate state vector $V2_{ins}$ then replaces the current value $V_n$ of the state vector V.

Alternatively, the pseudo-random generator 1 can include fifth calculation means 47 including an additional exclusive-OR gate 47a for calculating a new current value $V_{temp}$ of the state vector by applying an exclusive-OR operation to the current value of the additional second intermediate state vector $V2_{ins}$ and the current value $V_n$ of the state vector. This new current value $V_{temp}$ of the state vector then replaces the current value $V_n$ of the state vector.

Thus FIG. 8 shows that when it is determined that w=0 the pseudo-random generator 1 effects "empty" iterations on the state vector V for as long as $\underline{w}$ remains at 0, without incorporating the current intermediate value $X_\alpha$ into the state vector V since no encryption/decryption operation is effected on the input words $U_n/Y_n$ or output words $Y_n/U_n$ (in other words, 0 bits are encrypted/decrypted).

More specifically, before starting an encryption process, the value of the encryption key becomes the initial value $V_0$ of the state vector V: $V_0$=encryption key and $w_0=1$.

On the first iteration, the encryption/decryption module 17 takes the first bit of the input word $U_1$ to be encrypted and calculates the value of the first bit of the output word $Y_1$ encrypted as a function of $U_1$ and the initial value $V_0$ of the state vector V. The pseudo-random generator 1 calculates a first value $V_1$ of the state vector V as a function of $U_1$ and $V_0$.

By extension, on the $n^{th}$ iteration, if the pseudo-random generator 1 detects that $w_{n-1}=0$, the pseudo-random generator 1 effects "empty" iterations on the preceding value $V_{n-1}$ of the state vector for as long as $w_{n-1}=0$.

In contrast, if $w_{n-1} \neq 0$, the encryption/decryption module 17 takes the next $w_{n-1}$ bits of the data to be encrypted (block $U_n$) and calculates the value of the output word $Y_n$ as a function of $U_n$ and $V_{n-1}$. The pseudo-random generator 1 calculates a new value $V_n$ of the state vector V as a function of $U_n$ and $V_{n-1}$.

Symmetrically, before decryption, the value of the decryption key becomes the initial value $V_0$ of the state vector V: $V_0$=decryption key and $w_0=1$.

On the first iteration, the encryption/decryption module 17 takes the first bit of the input word Y1 to be decrypted and calculates the value of the first bit of the output word U1 decrypted as a function of Y1 and the initial value V0 of the state vector V. The pseudo-random generator 1 calculates a first value V1 of the state vector V as a function of Y1 and V0.

By extension, on the $n^{th}$ iteration, if the pseudo-random generator 1 detects that $w_{n-1}=0$, the pseudo-random generator 1 effects "empty" iterations on the preceding value $V_{n-1}$ of the state vector for as long as $w_{n-1}=0$.

In contrast, if $w_{n-1} \neq 0$, the encryption/decryption module 17 takes the next $w_{n-1}$ bits of the data to be decrypted (block $Y_n$) and calculates the value of the output word $U_n$ as a function of $Y_n$ and $V_{n-1}$. Furthermore, the pseudo-random generator 1 calculates a new value $V_n$ of the state vector V as a function of $Y_n$ and $V_{n-1}$.

Accordingly, the operations of the FIG. 8 example are such that the iterations effected on the pseudo-random generator 1 are desynchronized from the iterations effected by the encryption/decryption module 17 as a function of a non-accessible pseudo-random variable (fourth state variable E), the encryption/decryption key, and the whole of the sequence of input words $U_n/Y_n$ applied. The slightest modification of the sequence of input words $U_n/Y_n$ therefore leads systematically to modification of the whole of the subdivision of the data after that modification and therefore modification of how the pseudo-random generator 1 is desynchronized from the encryption/decryption module 17.

Note moreover that in order to avoid desynchronization of streams and empty cycles the size of the blocks to be encrypted/decrypted can be varied without having to address the situation where w=0; in this situation where w=0 only one bit must be encrypted/decrypted.

It is also possible to retain only the stream desynchronization function without varying the size of the blocks to be encrypted/decrypted. An empty cycle of the pseudo-random generator 1 is then effected if w=0 whereas for any other value of w an input word $U_n/Y_n$ or an output word $Y_n/U_n$ of fixed size m is encrypted/decrypted.

Cryptographic Multiplexing

The various embodiments of the encryption method and device of the invention can be used for high bit rate stream encryption applications (telecommunications, protected multimedia content broadcasting, on the fly encryption of data in servers, personal computers and software applications, etc.). Furthermore, the very structure of the encryption process suits it to applications in the field of cryptographic multiplexing.

Figure 11A:
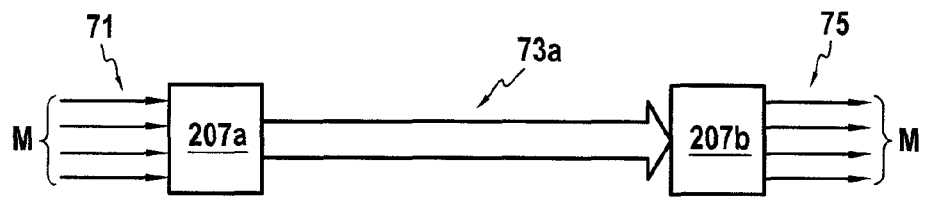
FIGS. 11A to 11C show examples of cryptographic multiplexing.
Figure 11B:
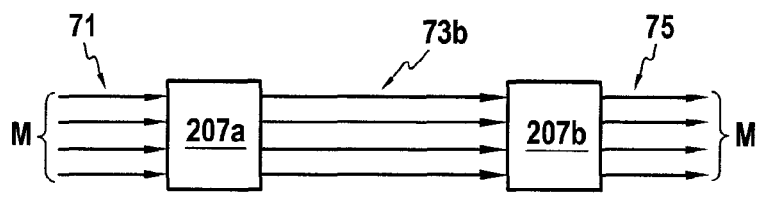
Figure 11C:
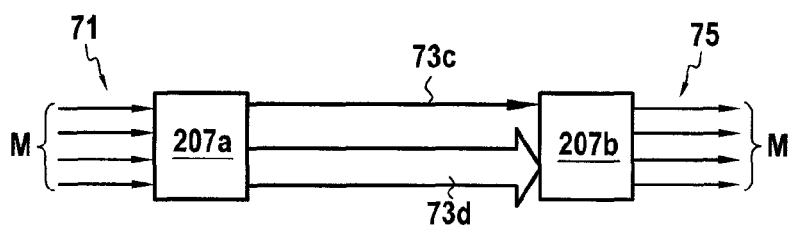

FIGS. 11A to 11C show examples of cryptographic multiplexing.

Generally speaking, cryptographic multiplexing causes M messages in clear 71 to be encrypted to converge toward the same encryption device 207a, which generates M encrypted messages. These M encrypted messages are then combined and sent via the same channel 73a (FIG. 11A) or separately via different channels 73b (FIG. 11B) to a user or to an application for which they are intended.

FIG. 11C shows that mixed solutions can be envisaged as a function of the number of transmission channels available and the respective bit rate of each of those channels. In this example, a first channel 73c sends a single encrypted message and a second channel 73d sends M−1 combined encrypted messages.

An encryption device 207b used in decryption mode (also referred to as a decryption device) then reconstitutes the M messages 75 in clear from the M encrypted messages. It is impossible to reconstitute only one of the M messages in clear if the M encrypted messages are not available or all of them.

This solution pools the cryptographic application and offers a simple and effective solution for protecting multiple contents that have to be routed over one or more non-secured channels.

The encryption method of the invention effects cryptographic multiplexing as described above using only one pseudo-random generator sized accordingly and M encryption/decryption modules in parallel. This enables an extremely simple hardware or software implementation benefiting from the performance of the encryption method in terms of speed and cryptanalysis resistance, as well as variable size block, empty iteration and stream desynchronization functions applied to M different messages.

Figure 12:
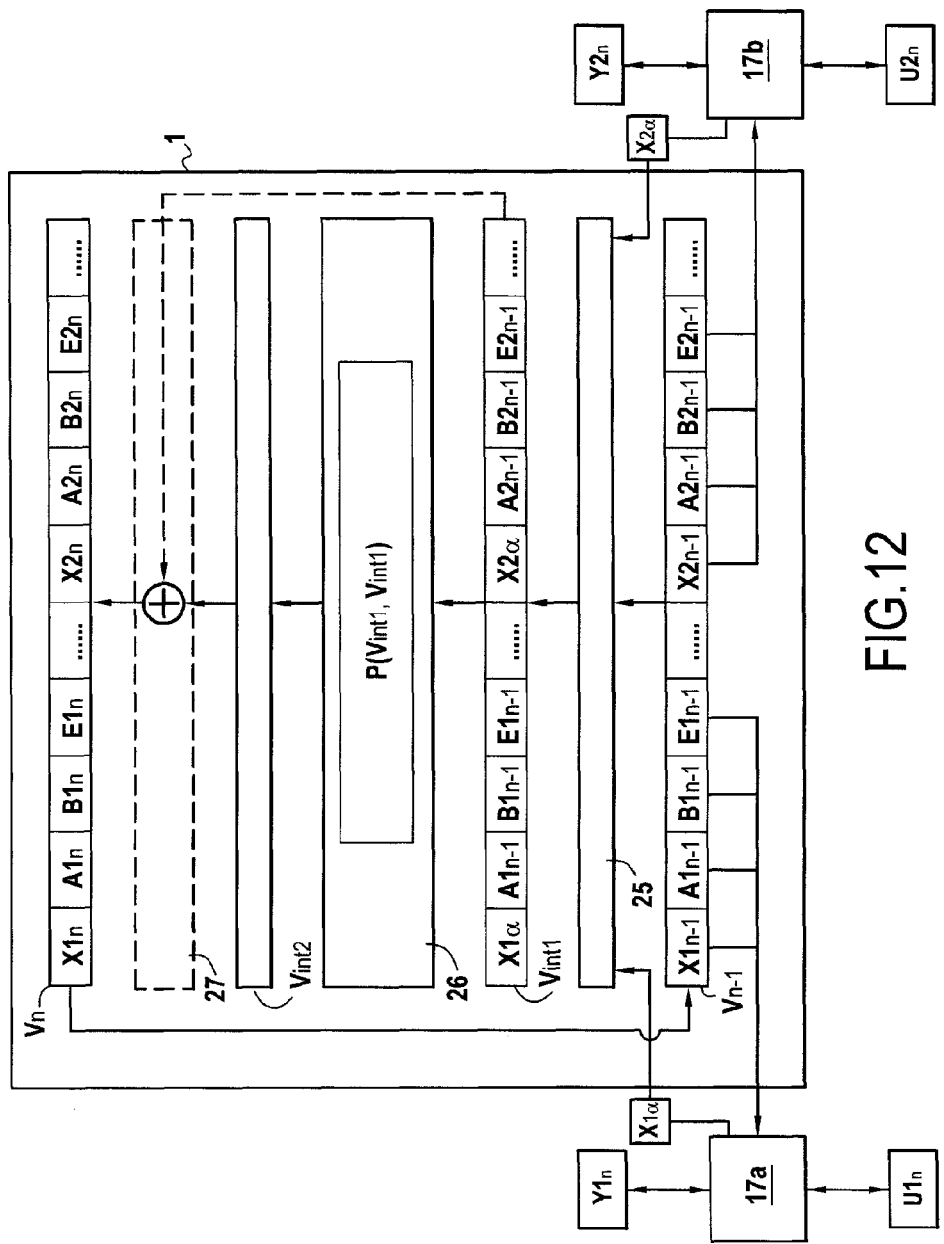
Figure 15A:
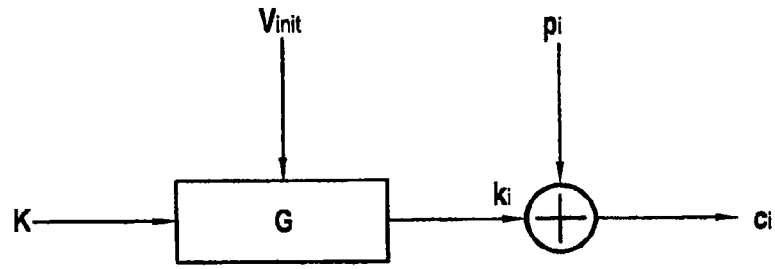
FIGS. 15A and 15B (already described) show diagrammatically two prior art encryption mechanisms.
Figure 15B:
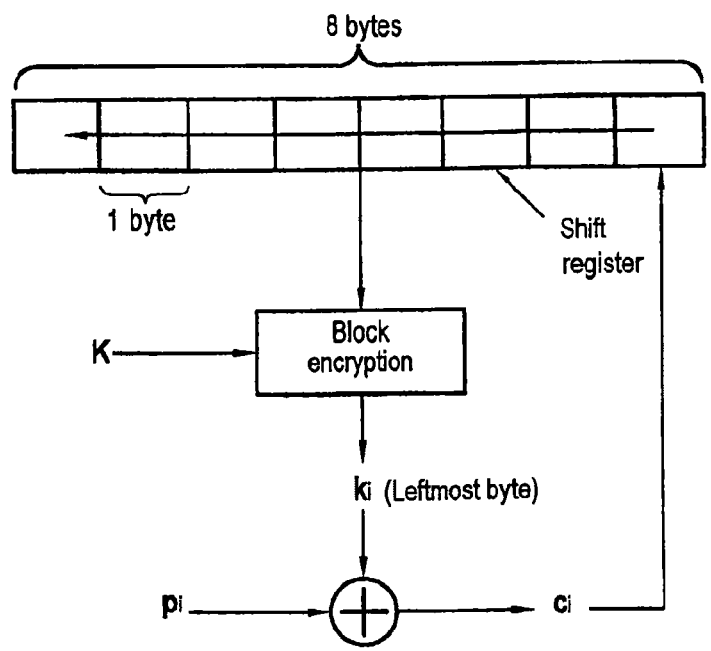

FIG. 12 shows an encryption device (that can operate in encryption mode and/or decryption mode) for performing cryptographic multiplexing and including only one pseudo-random generator 1 and two encryption/decryptions modules 17a, 17b in parallel.

In this situation, the pseudo-random generator 1 calculates on each iteration a current value of a state vector including a first set of state variable sections and at least one second set of state variable sections.

Generally speaking, to multiplex M messages (M=2 in FIG. 12), the current value $V_n$ of the state vector V of the pseudo-random generator 1 takes the following form:

$$V_n = ( \ldots X1_n, A1_n, B1_n, E1_n, \ldots X2_n, A2_n, B2_n, E2_n, \ldots \\ XM_n, AM_n, BM_n, EM_n, \ldots )$$

Moreover, the first encryption/decryption module 17a calculates a first current output word $Y1_n/U1_n$, by a first reversible application depending on a first current input word $U1_n/Y1_n$ and the first set of sections $X1_{n-1}$, $A1_{n-1}$, $B1_{n-1}$, $E1_{n-1}$ of the preceding value $V_{n-1}$ of the state vector. The intermediate value $X1_\alpha$ is sent to the pseudo-random generator 1.

The second encryption/decryption module 17b calculates a second current output word $Y2_n/U2_n$ by a second reversible application depending on a current input word $U2_n/Y2_n$ and the second set of sections $X2_{n-1}$, $A2_{n-1}$, $B2_{n-1}$, $E2_{n-1}$ of the preceding value $V_{n-1}$ of the state vector. The intermediate value $X2_\alpha$ is sent to the pseudo-random generator 1.

Figure 13:
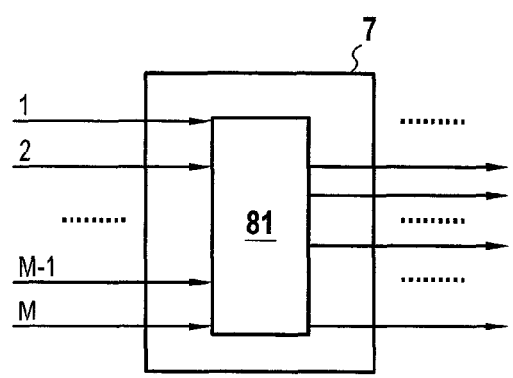
FIGS. 12 and 13 show applications of the encryption device of the invention to cryptographic multiplexing.

FIG. 13 shows very diagrammatically an example of an encryption device (that can be used in encryption mode and/or in decryption mode) including cryptographic multiplexing means 81.

In this example, the cryptographic multiplexing means 81 can multiplex at least two message blocks in clear to form at least two encrypted message blocks, each message block in clear corresponding to a succession of input words. The cryptographic multiplexing means 81 correspond to the setting the parameters of a pseudo-random generator 1 as shown in the above figures by a state vector including a fifth state variable F. Accordingly, the pseudo-random generator 1 can order the various message blocks encrypted on each iteration as a function of the fifth state variable F in the state vector.

Consequently, the order in the transmission channels of the M blocks encrypted on each iteration, whether combined or not, can be predefined or a function of a non-accessible pseudo-random variable (a section of the state vector), depending on the encryption key in encryption mode (respectively the decryption key in decryption mode) and the whole of the applied sequence of input words. For example, the M encrypted blocks, whether combined or not, can be ordered by the permutation function P with parameters set by the fifth state variable F included in the state vector.

The parameter for ordering the M blocks of the encrypted message combined during iteration n is supplied by the preceding value $F_{n-1}$ of the fifth state variable F, $F_{n-1}$ being a section of size M of the preceding value $V_{n-1}$ of the state vector, isolated from the input words and the output words and depending on the encryption key (respectively the decryption key) and the whole of the sequence of input words applied.

The order in the transmission channels of the M blocks of the encrypted message on each iteration, combined or not, is therefore pseudo-random, depending on the encryption key (respectively the decryption key) and the whole of the applied sequence of input words. The slightest modification to the sequence of input words therefore leads systematically to complete modification of the order of the blocks of the encrypted message in the transmission channels, combined or not, after that modification.

Cryptographic Hashing Method and Device

FIG. 14 shows that the pseudo-random generator 1 as represented diagrammatically in FIG. 1A can also be used in combination with a preconditioning module in a cryptographic hashing (or hash) device of the invention to generate a digest of the message.

Note that FIG. 14 also illustrates the principal steps of the cryptographic hashing method of the invention.

In the embodiment described in detail here, the state vector V includes a predetermined number $\underline{k}$ of bits and the initial value $V_0$ of the state vector corresponds to a configurable hashing key of size $\underline{k}$.

FIG. 14 shows a device 407 of one particular embodiment of the invention for cryptographically hashing a message Mess.

This device 407 includes means for dividing the message Mess into a predetermined number M of blocks $Z_1, Z_2, \ldots, Z_M$ of predetermined size (for example M blocks each of $\underline{m}$ bits). In a manner that is known in the art, if the last block in the subdivision is incomplete (i.e. does not comprise $\underline{m}$ bits), the incomplete block is padded out with bits at 0.

The device 407 further includes generation means for iteratively generating a succession 13 of M values of a state vector V from an initial value $V_0$ of the state vector and obtaining a digest hash of the message Mess from the latest value $V_M$ of the state vector generated. The message blocks $Z_1, Z_2, \ldots, Z_M$ are used in turn by the generation means during successive iterations to generate the M values of the state vector.

In the example envisaged here, the generation means include a pseudo-random generator 1 of the invention (for example the pseudo-random generator shown in FIGS. 1B and 3B) and a preconditioning module 417. Before cryptographic hashing by the cryptographic hashing method of the invention is started, the value of the hashing key becomes the initial value $V_0$ of the state vector V ($V_0$=hashing key).

On each iteration $\underline{n}$, the pseudo-random generator 1 calculates a current value $V_n$ of the state vector using a non-invertible application depending on the preceding value $V_{n-1}$ of the state vector and an intermediate current value $X_\alpha$ produced by a calculation carried out by the preconditioning module 417, the preconditioning module 417 calculating the current intermediate value $X_\alpha$ using an invertible application depending on the preceding value $V_{n-1}$ of the state vector and a current message block $Z_n$ (input block in the sense of the invention). On each iteration $\underline{n}$ the pseudo-random generator 1 feeds the state vector $V_n$ with the current intermediate value $X_\alpha$ from the preconditioning module 417.

On the first iteration, the preconditioning module 417 calculates the current intermediate value $X_\alpha$ for iteration 1 as a function of the first message block $Z_1$ and the initial value $V_0$ of the state vector. The pseudo-random generator 1 calculates a first value $V_1$ of the state vector V as a function of the first message block $Z_1$ and the initial value $V_0$ of the state vector.

By extension, on the $n^{th}$ iteration, the preconditioning module 417 calculates the current intermediate value $X_\alpha$ for iteration $\underline{n}$ as a function of the current message block $Z_n$ and the preceding value $V_{n-1}$ of the state vector and the pseudo-random generator 1 calculates a current value $V_n$ of the state vector V as a function of the current message block $Z_n$ (using the current intermediate value $X_\alpha$) and the preceding value $V_{n-1}$ of the state vector.

In the embodiment described here, the state vector V advantageously includes a set of sections including at least one first state variable X and one second state variable A of size $\underline{m}$. For example, the current value $V_n$ of the state vector V can be structured in the following manner where, in the sense of the invention, the state variables X and A are sections of the state vector:

$$V_n = (\ldots (X_n = (x_{n1} \ldots x_{nm})) \ldots (A_n = (a_{n1} \ldots a_{nm})) \ldots)$$

In this example, the current value $X_n$ of the first state variable X comprises $\underline{m}$ bits $X_{n1}, \ldots, X_{nm}$ and the current value $A_n$ of the second state variable A comprises $\underline{m}$ bits $a_{n1}, \ldots, a_{nm}$, where $\underline{m}$ is the size of the message blocks $Z_n$, $n=1, \ldots, M$.

The locations of the state variables are predefined and preferably fixed, but it is possible to assign them a position variable as a function of the value or values taken by one or more sections of the state vector, themselves of fixed position. Only the solution of a fixed position of the state variables is described below.

Moreover, it is preferable (although not necessary) for the sectors assigned to each of the state variables not to overlap. The size $\underline{k}$ of the state vector is then chosen accordingly, and each state variable corresponds to a section of the state vector of limited size (i.e. of size strictly less than that of the state vector).

Of course, the variants of the state variables described above in the context of an encryption method are equally applicable in the context of a cryptographic hashing method of the invention.

The value $X_n$ of the first state variable X is used in a subsequent iteration by an isolation function of the preconditioning module 417 before it is replaced by the intermediate value $X_\alpha$ produced by the calculation carried out in the next iteration by the preconditioning module 417. The value $A_n$ of the second state variable is also used in the next iteration by the isolation function of the preconditioning module 417.

On each iteration (for example on iteration $\underline{n}$), the transmission means 321 of the pseudo-random generator 1 send the preconditioning module 417 the preceding value $V_{n-1}$ of the state vector including at least the preceding value $X_{n-1}$ of the first state variable X and the preceding value $A_{n-1}$ of the second state variable A.

The reception means 323 of the pseudo-random generator 1 receive from the preconditioning module 417 the current intermediate value $X_\alpha$.

The first calculation means 325a replace the preceding value $X_{n-1}$ of the first state variable X by the current intermediate value $X_\alpha$ to calculate a current value of a first intermediate state vector $V_{int1}$. The other process steps and means of the pseudo-random generator 1 are similar to those described with reference to FIG. 1B (and FIG. 3B) and are not described in more detail here.

The preconditioning module 417 includes reception means 433 and isolation means 435 for isolating the current intermediate value $X_\alpha$ from the message blocks.

The reception means 433 receive from the pseudo-random generator 1 the preceding value $V_{n-1}$ of the state vector including at least the preceding value $X_{n-1}$ of the first state variable X and the preceding value $A_{n-1}$ of the second state variable A.

The isolation means 435 are adapted to apply a symmetrical secret key function to each message block $Z_n$, the secret key being obtained from at least one section of the preceding value of the state vector.

The secret key function used preferably includes at least one exclusive-OR operation, i.e. the isolation means 435 include at least one exclusive-OR gate with parameters set by a section of size $\underline{m}$ of the preceding value of the state vector. Alternatively, it can further include at least one bijective permutation in the sense of the invention with parameters set by a section of size $\underline{m}$ of the preceding value of the state vector.

In the example described here, the secret key function used by the isolation means 435 is made up of two bijective permutations in the sense of the invention and two exclusive-OR operations each with parameters set by a section of size $\underline{m}$ of the state vector $V_{n-1}$. The secret key of this function is made up of the section setting the parameters of the first bijective permutation, the section setting the parameters of the first exclusive-OR operation, the section setting the parameters of the second bijective permutation, and the section setting the parameters of the second exclusive-OR operation.

Thus the isolation means 435 include first and second bijective permutation means 439a and 439b separated by a first exclusive-OR gate 441a. A second exclusive-OR gate 441b receives the output of the second bijective permutation means 439b.

The bijective permutation means 439a and 439b considered here each use the permutation function P described above, with parameters set by respective different state variables of the state vector $V_{n-1}$. In other words, the above-mentioned different bijective permutation means use a permutation key of size $\underline{m}$ equal to a state variable of the state vector $V_{n-1}$. Accordingly:

the first bijective permutation means 439a use a first bijective permutation corresponding to the permutation function P with parameters set by a permutation key equal to the preceding value of the second state variable $A_{n-1}$; and the second bijective permutation means 439b use a second bijective permutation corresponding to the permutation function P with parameters set by a permutation key equal to the preceding value of the first state variable $X_{n-1}$.

The permutation keys used to set the parameters of the permutation function P in the bijective permutation means 439a and 439b are independent of the data to which the resulting permutation function P is applied, and each therefore uses an invertible (bijective) function. This invertible function P is the result of applying $\underline{m}$ successive permutations of size $\underline{m}$ selected as a function of the value of each bit of the permutation key concerned.

Thus calculating the current intermediate value $X_\alpha$ in an iteration $\underline{n}$ includes the following operations:

the first permutation means 439a calculate a first intermediate word $J_{1n}$ by applying the first bijective permutation to the current input block $Z_n$, that permutation having parameters set by a preceding value $A_{n-1}$ of the second state variable: $J_{1n}=P(Z_n, A_{n-1})$;

the first exclusive-OR gate 441a calculates a second intermediate word $J_{2n}$ by applying an exclusive-OR operation to the first intermediate word $J_{1n}$ and the preceding value $A_{n-1}$ of the second state variable: $J_{2n}=J_{1n} \oplus A_{n-1}$;

the second permutation means 439b calculate a third intermediate word $J_{3n}$ by applying the second bijective permutation to the second intermediate word $J_{2n}$, that permutation having parameters set by a preceding value $X_{n-1}$ of the first state variable: $J_{3n}=P(J_{2n}, X_{n-1})$;

the second exclusive-OR gate 441b calculates the current intermediate value $X_\alpha$ by applying an exclusive-OR operation to the third intermediate word $J_{3n}$ and the preceding value $X_{n-1}$ of the first state variable: $X_\alpha=J_{3n} \oplus X_{n-1}$.

This current intermediate value $X_\alpha$ is then sent to the pseudo-random generator 1.

Note that modifying one bit of the current block $Z_n$ (i.e. the message block in the process of being hashed) modifies a bit of the variable $X_\alpha$ incorporated in the state vector $V_{n-1}$ by the calculation means 325a of the pseudo-random generator 1 to form the first intermediate vector $V_{int1}$ in iteration $\underline{n}$. Consequently, the choice of the permutations implemented by the calculation means 326 is assigned to one stage of permutation, and thus in consequence the whole of the state vector $V_n$ and the subsequent state vectors will also be modified (avalanche effect).

After M successive iterations using the M message blocks constituting the message Mess, the digest hash of the message Mess is formed by the cryptographic hashing device 407 from the latest (i.e. the $M^{th}$) state vector generated by the pseudo-random generator 1, in other words: hash=$V_M$.

This provides for extremely simple hardware or software implementation of a cryptographic hashing method and device benefiting from the speed and cryptanalysis resistance performance of the pseudo-random generation method.

Moreover, in accordance with principles similar to those implemented for the encryption device of the invention, it is possible to consider message blocks $Z_n$ of a size variable as a function of the iteration (i.e. subdividing the message Mess as the iterations proceed into blocks whose size $\underline{w}$ is variable and specified in a section of the state vector) and/or to desynchronize the operations effected in the preconditioning module and in the pseudo-random generator (in particular by introducing "empty iterations" as described for the encryption device.

Moreover, in one particular embodiment of the invention it is equally possible to chain $\underline{h}$ hashing devices sequentially (a section of a state vector generated by the pseudo-random generator of a hashing device feeding the preconditioning module of the next hashing device) to increase the mathematical complexity of the cryptographic hashing.

Moreover, in one particular embodiment of the invention, it is possible to effect the cryptographic hashing by the hashing method of the invention simultaneously with encrypting (respectively decrypting) the message using the architecture of the encryption method of the invention.

Implementation of the Permutation Function P

How the permutation function P used in the above examples works is described in more detail below with reference to FIGS. 9A to 9E.

As mentioned above, in a manner that is highly advantageous here, the pseudo-random generator (and generation method), the encryption device (and method), and the cryptographic hashing device (and method) rely on the same permutation function P proposed by the invention with parameters set by a permutation key and parameters that can be set as a function of the size of the input data and the key concerned.

Thus the permutation function P in these examples has the advantage of addressing a plurality of requirements.

In one case, the size of the permutation key is equal to the size of the input data that is also equal to the size of the output data (for example for encryption or cryptographic hashing, but also for pseudo-random generation in the example shown in FIG. 3A). This is referred to as "square" permutation function.

In another case, the size of the permutation key is strictly less than the size of the input data that is also equal to the size of the output data (for example for pseudo-random generation in the example shown in FIGS. 1B and 3B). This is referred to as "rectangular" permutation.

In a further case, the permutation function P can have parameters set so that it can be applied both to the input data of size $e$ ($e=k1 \geq k$–size of the state vector V) and $m$ (size of the data U/V to be encrypted/decrypted). In further cases, the permutation function P can have parameters set so that it can be applied to input data of any size $e=w$ enabling access to functions for modifying the number of bits encrypted on each iteration.

FIG. 9A shows a permutation table including boxes 61a-61f and in which each box indicates the source position of the bit that appears at the location concerned. On movement each bit retains its value: $v(i)$=binary value (0 or 1) of the $i^{th}$ bit of the data concerned.

In this example, the first bit of the input data is shifted to the $3^{rd}$ location (box 61c) of the output data retaining its value $v(1)$. The second bit of the input data is shifted to the $k^{th}$ location (box 61f) of the output data retaining its value $v(2)$. The third bit of the input data is shifted to the $4^{th}$ location (box 61d) of the output data retaining its value $v(3)$. The fourth bit of the input data is shifted to the $1^{st}$ location of the output data retaining its value $v(4)$. The $k^{th}$ bit of the input data is shifted to the $2^{nd}$ location (box 61b) of the output data retaining its value $v(k)$.

According to the choice made for the key relative to the input data to which the permutation function P is applied, the permutation function P is:
- a one-way function and therefore non-reversible (non-invertible) if the permutation key is generated from input data (for example key=input data); these one-way function properties are exploited in the operations carried out by the pseudo-random generator 1 and in a cryptographic module of the invention; or
- a bijective function (bijective key permutation) that is therefore reversible provided that the value of the permutation key is known and the permutation key is independent or fixed relative to the input data; these bijective function properties can be exploited in the isolation functions or means of the encryption/decryption module 17 or the preconditioning module 417 of the cryptographic hashing device.

To apply the permutation function P with parameters set by the permutation key C of size $p$ to the data to be permutated of size $e$, there are chained to the data to be permutated $p$ permutations of size $e$ with parameters set by the value of the $p$ bits of the permutation key, i.e. each permutation is chosen as a function of the value of a distinct bit of the permutation key.

For each bit of the permutation key, the permutation is chosen from a pair of different permutations (P0, P1) of size $e$ predefined for each permutation stage. For example, if the bit of the permutation key considered is equal to 0 permutation P0 is chosen and if the bit of the permutation key considered is equal to 1 permutation P1 is chosen.

The permutations of size $e$ considered can in particular be chosen from predefined pairs of permutations (P0, P1) satisfying at least one of the following conditions:
- for each bit of the key, the permutation obtained by respectively composing P0 and P1 and the permutation obtained by respectively composing P1 and P0 are different at all points;
- there is used in each of the $p$ stages of the permutation function (a stage corresponding to the application of a permutation), an identical pair of permutations P0 and P1 different at all points, i.e., for any $t$, the position of the bit $t$ at the output for the first permutation is different from the position of the bit $t$ at the output for the second permutation;
- there is used in each stage a pair of permutations (P0; P1) such that the permutations P0 and P1 are individually different at all points from the identity permutation, i.e. a bit at position $t$ before application of permutation P0, respectively P1, is located at a position different from $t$ on exit from the permutation P0, respectively the permutation P1.

Alternatively, a pair of different permutations ($P0_i$, $P1_i$) can be applied in each permutation stage $i$.

Thus, for data of any size $e$ to be processed, the permutation function P proceeds in two steps:
- in a first step, a table of size (p, 2e) made up of $p$ rows each of two permutations (P0, P1) of size $e$, which also serves as a routing matrix in a hardware implementation, is calculated beforehand;
- in a second step, and when using the permutation function P, each row $i$ of this table provides two possible permutations, one or the other of those permutations being chosen as a function of the value vkey(i) of the $i^{th}$ bit of the permutation key used.

For a given permutation key value, the permutation function P thus chains to the input data $p$ permutations of size $e$ respectively with parameters set by the value of each of the $p$ bits of the permutation key.

FIG. 9B shows an example of five different pairs of successive permutations of size e=5 used in the respective five permutation stages of a permutation function P and to be applied to input data of size e=5 as a function of the value vkey(i) of the $i^{th}$ bit of a permutation key of size p=5 of the function P (square permutation function P).

FIG. 9C shows an example of an identical pair of two different permutations of size e=5 used for each of the five permutation stages of a permutation function P and to be applied to input data of size e=5 as a function of the value vkey(i) of the $i^{th}$ bit of a permutation key of size p=5 of the function P (square permutation function P).

FIG. 9D shows an example of five different pairs of successive permutations of size e=7, respectively used in the five permutation stages of a permutation function P and to be applied to input data of size e=7 as a function of the value vkey(i) of the $i^{th}$ bit of a permutation key of size p=5 of the function P (rectangular permutation function P).

Figures 9E, 10A:
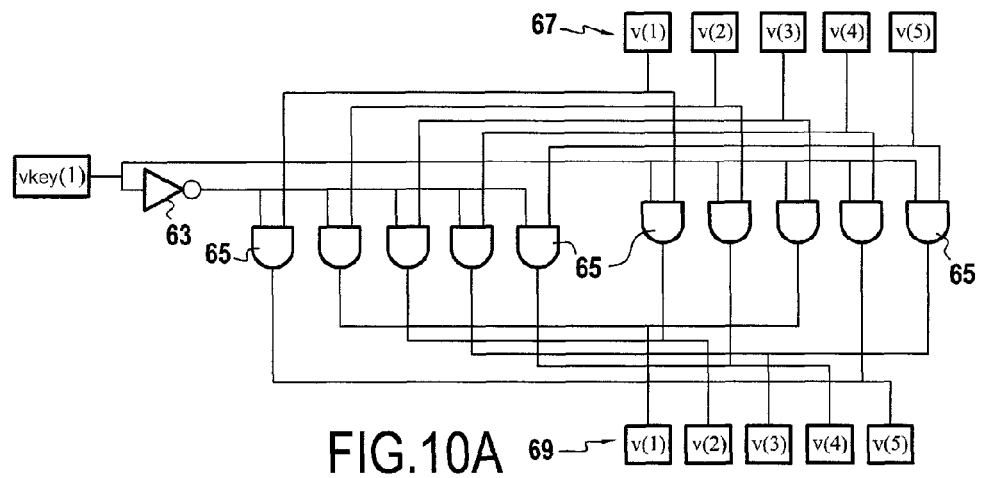

FIG. 9E shows an example of an identical pair of two different permutations of size e=7, used for each of the five permutation stages of a permutation function P and to be applied to input data of size e=7 as a function of the value vkey(i) of the $i^{th}$ bit of the permutation key of size p=5 of the function P (rectangular permutation function P).

A main advantage of the permutation function P described above is its very simple hardware implementation, which can employ only "NOT" and "AND" logic functions.

Figure 10B:
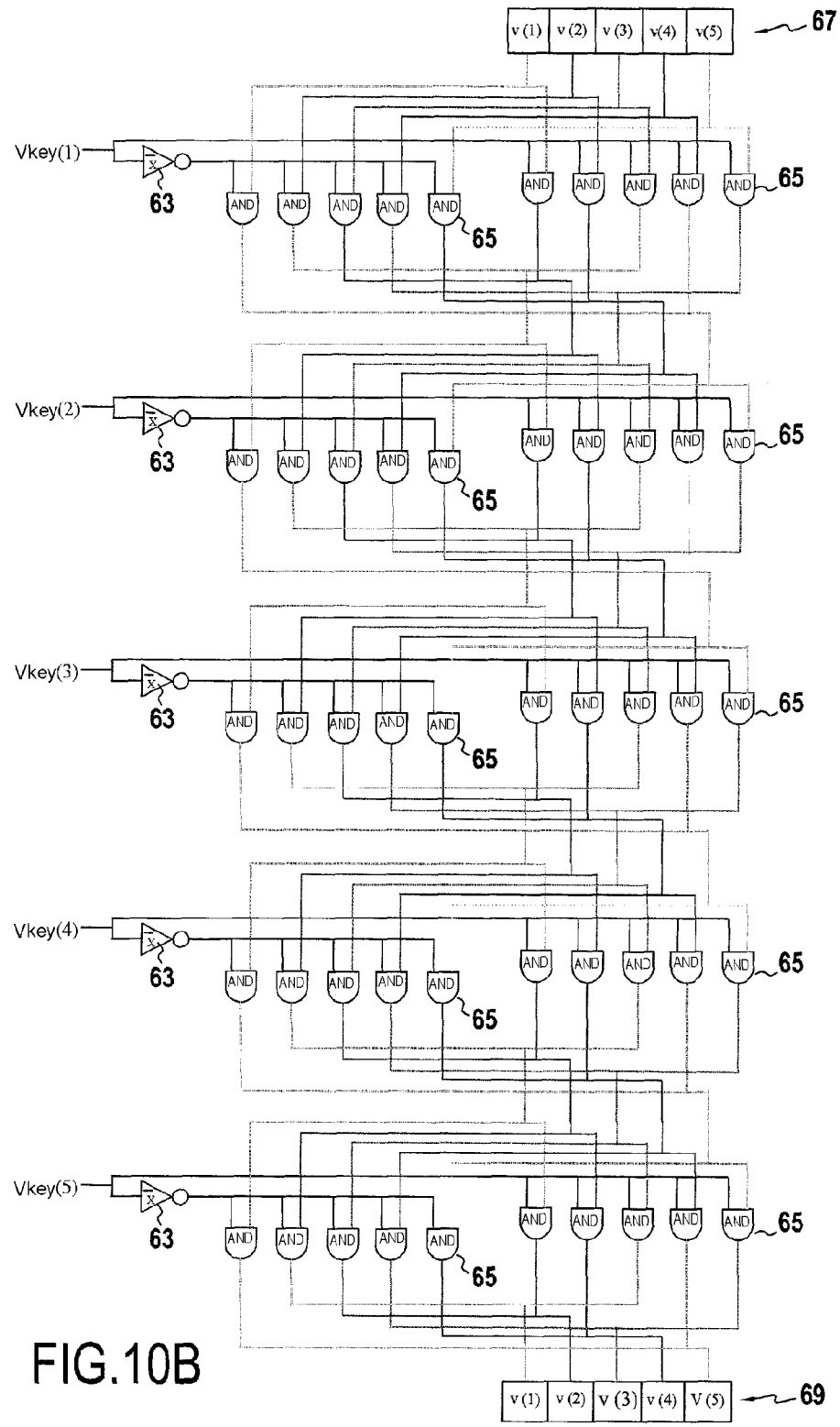

FIGS. 10A and 10B shows permutation means including logic gates 63, 65 for selecting for each bit vkey(i), i=1, . . . , p, a permutation key of size $p$, one of two predefined permutations of size $e$ (size of the data to be permutated) as a function of the value of the bit vkey(i), and thus enabling chaining of $p$ permutations with parameters set by the value of each of the $p$ bits of said permutation key.

The FIG. 10A example shows more particularly the wiring of the first permutation stage of the permutation function P from FIG. 9C for p=5 and e=5 using a "NOT" logic gate 63 and "AND" logic gates 65.

The AND logic gate 65 corresponds in this application to a switch (or a transistor in a hardware implementation) controlled by the value vkey of a bit of the permutation key or its complement. The switch is therefore open or closed as a function of the value vkey of the bit of the key or its complement (turned on or turned off when the switch is a transistor).

The stages are therefore chained one after the other, the output 69 of the stage h-1 feeding the input 67 of the stage h.

By applying to the inputs of the first stage the respective values of each bit of the data to be permutated and to the key input of each stage the respective value of the bit of the associated key there is obtained a logic function that can be executed in only one operation over all the p stages, corresponding to p permutations of size e effected on input data of size e and with parameters set by a key of size p. If an identical pair of two different permutations is used for each of the p stages, p identical modules are used.

FIG. 10B shows an example of hardware implementation of an identical pair of two different permutations used for each of the p=5 stages to be applied to the input data of size e=5 as a function of the value vkey(i) for p=5 as shown in FIG. 9C.

For software implementation, a recursive function can be used having for its parameters: the input data, the permutation key, the permutation table and the permutation stage i concerned. The permutation function P is calculated extremely quickly by calling the following "recursive function" with i=p:

---

Output data = recursive function (input data, key, permutation table, i).
If i = 1; then
    If Vkey(1) = 0; then
        Output data = Permutation(1)_Vkey_0 (input data)
    Else,
        Output data = (Permutation(1)_Vkey_1 (input data)
    Endif
Else,
    If Vkey(i) = 0; then
        Output data = Permutation(i)_Vkey_0 (recursive function (input data, key, permutation table, i−1))
    Else,
        Output data = Permutation(i)_Vkey_1 (recursive function (input data, key, permutation table, i−1))
    Endif
Endif
End of function.

---

The hardware and software implementations described above have the advantage that they can be used regardless of the nature of the permutation key concerned (i.e. dependent on or independent of the input data to be permutated), i.e. whether the permutation function P is a one-way function or if the permutation function P is a bijective key permutation. This has the advantage of limiting the complexity of implementing the processes and devices described above.

The present invention thus provides a pseudo-random generator with parameters set by an encryption key of any size k (used as the initial value of the state vector), effecting iterations on a state vector fed on each iteration with an intermediate result coming from an encryption/decryption module, and thus depending on the whole of the applied input sequence. The encryption/decryption module integrates self-isolation functions of the pseudo-random generator and carries out on each iteration the encryption and/or decryption of input data as a function of the values of a plurality of sections of the state vector of the pseudo-random generator.

Thus the encryption device of the invention has the following advantages in particular:

The encryption/decryption module is reversible whether implemented in hardware or software. It is therefore not necessary to have different programs/circuits for the encryption and decryption functions.

The pseudo-random generator is non-reversible.

A permutation function P is effected in a single extremely fast operation whether implemented in hardware or software, used in a non-invertible form P(data,key(data)) (i.e. the key depends on the data to be permutated) in the pseudo-random generator and in an invertible form P(data, fixed_key) (i.e. the key is fixed in relation to the data to be permutated) in the encryption/decryption module.

The pseudo-random generator has no particular period and does not follow a predefined cycle. The value of the state vector depends on the encryption/decryption key and on the whole of the applied sequence of input words, with no deterministic cycle, because of switching on each iteration from one attractor (cycle specific to a particular input sequence) to another.

The state vector pseudo-random generator proposed by the invention is such that the value of the state vector cannot be reconstructed from observation of the sequences of output words or intentionally brought to a predefined value by a sequence of input words (non-observable and non-commandable state vector). The state vector isolates input and output words using isolation functions with parameters set by the values of certain of its own state variables (self-isolation). Apart from resistance to cryptanalysis, this property eliminates problems of modification of the initialization vector each time the encryption process is started. The encryption/decryption key that serves as an initialization vector therefore need not be modified. Additionally a message header can be used beginning with a Nonce (Number used once) of the message number type in order to avoid leaking of information concerning the fact that the messages have similar headers.

The invention offers the possibility of modifying the number of bits encrypted on each iteration as a function of a pseudo-random variable that is not accessible (a section of the state vector) and depends on the encryption/decryption key and the whole of the applied sequence of input words.

Another option is for the pseudo-random generator to effect "empty cycles" (iterations effected on the state vector without encrypting the inputs), as a function of a pseudo-random variable that is not accessible (a section of the state vector) and depends on the encryption/decryption key and the whole of the applied sequence of input words, leading to desynchronization of the pseudo-random generator and the data encryption/decryption module.

A further option is to use the encryption device as a cryptographic multiplexer, by having M messages in clear to be encrypted to converge on the same encryption module that generates M encrypted messages. It is impossible to reconstruct a single one of the M messages in clear or all of them if the M encrypted messages are not accessible. The encrypted messages can be combined with each other to reduce the number of transmission channels. The order of the encrypted blocks in the transmission channel on each iteration, combined or otherwise, can be predefined or a function of a pseudo-random variable that is not accessible (a section of the state vector) and depends on the encryption key and the whole of the applied sequence of input words.

The invention finds a highly advantageous application in that it enables simultaneous cryptographic hashing and symmetrical encryption/decryption offering a high level of security and simple and efficient implementation in hardware or in software.

Note that cryptographic hashing and symmetrical encryption are routinely used in all types of communication, such as mobile communication, the Internet, smart cards, etc.

The invention claimed is:

1. A cryptographic method by a pseudo-random generator of generating a current value for a state vector of size k corresponding to a current iteration of a pseudo-random data sequence formed by a succession of values for the state vector generated iteratively from an initial value of the state vector, the method comprising:
   obtaining, with a processing device, a current intermediate value calculated from a preceding value of the state vector generated in a previous iteration;
   forming, with the processing device, a permutation key by selecting d bits from a first intermediate vector of size k, wherein d is less than or equal to k and the first intermediate vector is formed from the preceding value of the state vector in which a section has been replaced by the current intermediate value;
   determining, with the processing device, d permutations, each of size k1, as a function at least of the value of a respective associated bit of the permutation key;
   successively applying, with the processing device, each of the permutations to a provisional vector of size k1 to determine a result vector, wherein k1 is greater than or equal to k and the provisional vector includes the first intermediate vector; and
   determining, with the processing device, the current value of the state vector from at least one section of said result vector.

2. A cryptographic method according to claim 1, wherein the provisional vector further includes a vector obtained by complementing to 1 each bit of the first intermediate vector.

3. A cryptographic method according to claim 1, wherein the current value of the state vector is the result of applying an exclusive-OR operation to said section of the result vector of said application step and the value of the state vector of previous iteration.

4. A cryptographic method according to claim 1, wherein said provisional vector and the permutation key are of a same size and are equal to the first intermediate vector's size.

5. Use of a cryptographic method according to claim 1 to generate a pseudo-random data sequence in a method of cryptographically hashing a message to generate a digest of said message, said message including a predetermined number M of data blocks each used in turn as input blocks during successive iterations of the cryptographic method of generating a pseudo-random data sequence to generate M values of the state vector, said digest of said message being obtained from a latest generated value of the state vector.

6. A computer memory device having a computer program stored therein, the computer program including program code instructions for executing the cryptographic hashing method according to claim 5 when said program is loaded into and executed in a computer or a data processing system.

7. A method of encrypting an input data sequence, in which, from an initial value of a state vector of size k and a succession of input words forming said input data sequence, there is generated iteratively a succession of values of the state vector in accordance with the cryptographic method of claim 1 and a succession of output words, each iteration being accomplished by a central processing unit and including:
   an encryption step in which a current output word for said iteration is calculated by a reversible application depending on a current input word and a value of the state vector generated in a previous iteration; and
   a pseudo-random generation step in which a current value of the state vector for said iteration is calculated by a non-invertible application depending at least on said value of the state vector of previous iteration;
   and wherein:
   said reversible application includes at least first and second secret key functions, said secret keys being generated from at least one section of the value of the state vector of previous iteration; and
   said non-invertible application further depends on a current intermediate value, said current intermediate value depending on the value of the state vector of previous iteration and on the current input word, and being isolated from the input words, and from the output words, by means of said first secret key function and said second secret key function.

8. An encryption method according to claim 7, wherein one or both of said first and second secret key functions includes at least one exclusive-OR operation with parameters set by at least one section of the secret key of that function.

9. An encryption method according to claim 7, wherein said provisional vector includes the vector obtained by complementing to 1 each bit of the first intermediate vector.

10. An encryption method according to claim 7, wherein the current value of the state vector is the result of an exclusive-OR operation applied to said section of the result vector of said application step and the value of the state vector of previous iteration.

11. An encryption method according to claim 7, wherein at least one of the input words and the output words includes a number (w) of bits variable as a function of the iteration and the state vector includes a section indicating said number of bits variable in each iteration.

12. An encryption method according to claim 11, wherein the pseudo-random generation step of each iteration further includes, when it is determined from the current value of the state vector that said variable number of bits is zero, calculating a new current value of the state vector, replacing said current value of the state vector, by a non-invertible application depending on said current value of the state vector.

13. An encryption method according to claim 7, wherein:
   said pseudo-random generation step is a first pseudo-random generation step forming a current value of a first state vector;
   said first pseudo-random generation step is combined in parallel with at least one second pseudo-random generation step forming a current value of a second state vector; and
   the current value of the state vector is the result of applying an exclusive-OR operation to the current value of the first state vector and at least the current value of the second state vector.

14. An encryption method according to claim 7, wherein said encryption step is a first encryption step in which there are calculated:
   a first current output word by a first reversible application depending on a first current input word and at least one first section of the value of the state vector of previous iteration; and
   a first current intermediate value; and
   said method further including at least one second encryption step in which there are calculated:
   a second current output word according to a second reversible application depending on a second current input word and at least one second section of the value of the state vector of previous iteration; and a second current intermediate value;

said current intermediate value used during the pseudo-random generation step including said first current intermediate value and at least said second current intermediate value.

15. An encryption method according to claim 14, further including a step of cryptographically multiplexing at least two message blocks to be encrypted to form at least two encrypted message blocks, each message block to be encrypted corresponding to a succession of input words, and wherein said at least two encrypted message blocks are ordered in each iteration as a function of a section of the value of the state vector of previous iteration.

16. An encryption device for encrypting an input data sequence in accordance with the method of claim 7, and generating iteratively from an initial value of a state vector and a succession of input words forming said input sequence, a succession of values of the state vector, and a succession of output words, said encryption device using in each iteration:

encryption means adapted to calculate a current output word for said iteration by a reversible application depending on a current input word and a value of the state vector generated in a previous iteration; and a pseudo-random generator adapted to calculate a current value of the state vector for said iteration by a non-invertible application depending at least on the value of the state vector of previous iteration;

and wherein:

said reversible application includes at least first and second secret key functions, the secret keys being generated from at least one section of the value of the state vector of previous iteration; and said non-invertible application further depends on a current intermediate value, said current intermediate value depending on the value of the state vector of previous iteration and on the current input word, and being isolated from the input words, and from the output words, by means of said first secret key function and said second secret key function.

17. An encryption device according to claim 16, wherein said pseudo-random generator is a cryptographic generator for generating a pseudo-random data sequence.

18. An encryption device according to claim 16 adapted to process at least one of input words and output words comprising a number of bits variable as a function of the iteration, said device further including means for determining said variable number of bits in each iteration from a section of the state vector and said pseudo-random generator further including means for calculating a new current value of the state vector replacing said current value of the state vector by a non-invertible application depending on said current value of the state vector when it is determined from the current value of the state vector that said variable number of bits is zero.

19. An encryption device according to claim 16, further including a device for cryptographically multiplexing at least two message blocks in clear to form at least two encrypted message blocks, each message block in clear corresponding to a succession of input words, and wherein said at least two encrypted message blocks are ordered in each iteration as a function of a section of the preceding value of the state vector.

20. A computer memory device having a computer program stored therein, the computer program including program code instructions for executing the encryption method according to claim 7 when said program is loaded into and executed in a computer or a data processing system.

21. A computer memory device having a computer program stored therein, the computer program including program code instructions for executing the method of generating a pseudo-random data sequence according to claim 1 when said program is loaded into and executed in a computer or a data processing system.

22. A cryptographic generator of a pseudo-random data sequence formed of a succession of values of a state vector of size k generated iteratively from an initial value of the state vector, said generator including means for using in each iteration to generate a current value of the state vector for said iteration:

means for obtaining a current intermediate value calculated from a preceding value of the state vector generated in a previous iteration;

means for forming a permutation key of predetermined size d by selecting d bits from a first intermediate vector of size k, wherein d is less than or equal to k and the first intermediate vector is formed from the preceding value of the state vector in which a section has been replaced by the current intermediate value;

means for associating with each bit of the permutation key a permutation of size k1 chosen as a function at least of the value of that bit;

means for applying successively to the input vector the d permutations of size k1 to a provisional vector of size k1 to determine a result vector, wherein k1 is greater than or equal to k and the provisional vector includes the first intermediate vector; and means for determining the current value of the state vector from at least one section of the result vector.

23. A cryptographic hashing device generating a digest from a message including a predetermined number M of data blocks, said hashing device including:

a cryptographic generator according to claim 22, generating a succession of M values of a state vector in M successive iterations; and means for, in each of the M iterations:

calculating the current intermediate value for that iteration from a current data block of the message and the value of the state vector of previous iteration generated by said cryptographic generator; and supplying said current intermediate value to the cryptographic generator;

means for obtaining said digest from a latest value of the state vector generated by said generator.

* * * * *